United States Patent
Yang

(10) Patent No.: US 12,075,095 B2
(45) Date of Patent: *Aug. 27, 2024

(54) DEVICE AND METHOD FOR CODING VIDEO DATA

(71) Applicant: FG Innovation Company Limited, Tuen Mun (HK)

(72) Inventor: Yu-Chiao Yang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,278

(22) Filed: Jun. 9, 2022

(65) Prior Publication Data

US 2022/0303581 A1 Sep. 22, 2022

Related U.S. Application Data

(63) Continuation of application No. 16/987,304, filed on Aug. 6, 2020, now Pat. No. 11,405,648.

(Continued)

(51) Int. Cl.
*H04N 19/70* (2014.01)
*H04N 19/184* (2014.01)
*H04N 19/51* (2014.01)

(52) U.S. Cl.
CPC ........... *H04N 19/70* (2014.11); *H04N 19/184* (2014.11); *H04N 19/51* (2014.11)

(58) Field of Classification Search
CPC .... H04N 19/174; H04N 19/184; H04N 19/51; H04N 19/70
See application file for complete search history.

(56) References Cited

U.S. PATENT DOCUMENTS

| | | | |
|---|---|---|---|
| 2011/0228844 A1* | 9/2011 | Watanabe | H04N 19/593 |
| | | | 375/240.03 |
| 2017/0332095 A1* | 11/2017 | Zou | H04N 19/537 |

(Continued)

FOREIGN PATENT DOCUMENTS

| | | |
|---|---|---|
| CN | 109076214 A | 12/2018 |
| EP | 3451669 A1 | 3/2019 |

OTHER PUBLICATIONS

He, Yong et al. "Unified syntax for JVET-O0184/O0250/O0504 on DMVR and BDOF flag", Joint Video Experts Team (JVET) of ITU-TSG 16 WP3 and ISO/IEC JTC 1/SC 29/WG11, Document: JVET-O1140-v1, 15th Meeting: Gothenburg, SE, Jul. 3-12, 2019.

(Continued)

*Primary Examiner* — Anner N Holder
(74) *Attorney, Agent, or Firm* — ScienBiziP, P.C.

(57) ABSTRACT

A method of decoding a bitstream by an electronic device is provided. Encoded data is received for at least one image frame each including one or more regions. A first affine flag is determined from a sequence parameter set (SPS) associated with the at least one image frame when an affine mode including affine tools is enabled in the at least one image frame. A second affine flag is present in the SPS when the first affine flag is equal to one. A third affine flag corresponding to one of the affine tools is present in a slice header associated with a specific one of the one or more regions when the second affine flag is equal to one. The specific region is reconstructed based on first candidate modes including the one of the affine tools when the third affine flag is equal to zero.

19 Claims, 7 Drawing Sheets

Related U.S. Application Data

(60) Provisional application No. 62/884,335, filed on Aug. 8, 2019.

(56) References Cited

U.S. PATENT DOCUMENTS

| | | | |
|---|---|---|---|
| 2018/0270500 | A1 | 9/2018 | Li et al. |
| 2019/0222859 | A1 | 7/2019 | Chuang et al. |
| 2019/0230350 | A1 | 7/2019 | Chen et al. |
| 2019/0327480 | A1* | 10/2019 | Morishige ............ H04N 19/174 |
| 2020/0021845 | A1 | 1/2020 | Lin et al. |
| 2020/0221138 | A1 | 7/2020 | Lee |
| 2020/0296405 | A1 | 9/2020 | Huang et al. |
| 2020/0304805 | A1* | 9/2020 | Li ........................ H04N 19/176 |
| 2020/0314445 | A1 | 10/2020 | Park et al. |
| 2020/0351495 | A1 | 11/2020 | Li et al. |
| 2021/0029370 | A1 | 1/2021 | Li et al. |
| 2021/0195227 | A1 | 6/2021 | Lee et al. |
| 2021/0274213 | A1 | 9/2021 | Xiu et al. |
| 2021/0274217 | A1 | 9/2021 | Lim et al. |
| 2022/0060695 | A1* | 2/2022 | Zhang ................. H04N 19/109 |

OTHER PUBLICATIONS

Xiu, Xiaoyu et al., "CE4/9-related: Combined Test of JVET-O0593/JVET-O0252/JVET-O0281/JVET-O0615 on harmonization on BDOF and PROF", Joint Video Experts Team (JVET) of ITU-T SG 16 WP 3 and ISO/IEC JTC 1/SC 29/WG11, Document: JVET-O1142-spec-change-WD-r2 Jul. 12, 2019 (Jul. 12, 2019) chapter 7.4.3.3.

Luo, Jiancong(Daniel) et al., "CE4: Prediction refinement with optical flow for affine mode (Test 2.1)", Joint Video Experts Team (JVET) of ITU-T SG 16 WP3 and ISO/IEC JTC 1/SC 29/WG 11, Document: JVET-O0070, 15th Meeting: Gothenburg, SE, Jul. 3-12, 2019.

Non-Final Rejection dated Nov. 9, 2021 for U.S. Appl. No. 16/987,304 which is the parent application of the instant application.

Notice of Allowance dated Mar. 23, 2022 for U.S. Appl. No. 16/987,304 which is the parent application of the instant application.

Benjamin Bross et al: "Versatile Video Coding (Draft 6)", 127 MPEG Meeting; Jul. 8, 2019-Jul. 12, 2019; Gothenburg; (Motion Picture Expert Group or ISO/IEC JTC1/SC29/WG11), Gothenburg SE; No. JVET-O2001-VE, Jul. 31, 2019 (Jul. 31, 2019), p. 95-p. 96, p. 126.

Xiaoyu Xin et al: "CE4-related: Harmonization of BDOF and PROF", 15 JVET Meeting; Jul. 3, 2019-Jul. 12, 2019; Gothenburg; (The Joint Video Exploration Group of ISO/IEC JTC1/SC29/WG11 and ITU-T SG16), No. JVET-O0593, Jun. 26, 2019 (Jun. 26, 2019), p. 1, paragraph 1-p. 2, paragraph 2.

Kondo (Sony) K et al: "Non-CE4: Support slice level disabling for PROF", 16 JVET Meeting; Oct. 1, 2019-Oct. 11, 2019; Geneva; (The Joint Video Exploration Team of ISO/IEC JT1/SC29/WG11 and ITU-T SG16), No. JVET-P0601, Oct. 3, 2019 (Oct. 3, 2019), p. 1, Abstract and Proposed method; p. 4, paragraph 2-p. 5, paragraph 2.2.

* cited by examiner

DEVICE AND METHOD FOR CODING VIDEO DATA

CROSS-REFERENCE TO RELATED APPLICATION(S)

This application is a continuation application of U.S. patent application Ser. No. 16/987,304, filed on Aug. 6, 2020, which claims the benefit of and priority to U.S. Provisional Patent Application Ser. No. 62/884,335, filed on Aug. 8, 2019. The contents of all of the above-mentioned applications are hereby fully incorporated herein by reference in their entirety.

FIELD

The present disclosure generally relates to video coding and, more particularly, to techniques for controlling an affine tool to be enabled or disabled by different syntax structures having different syntax levels for reconstructing image frames in encoded data.

BACKGROUND

In a conventional video coding method, an encoder may encode video data to generate encoded data having a plurality of flags and provide the encoded data to a decoder. The flags may indicate whether a plurality of coding modes is enabled or not. For example, the encoded data may include a block-based affine flag indicating whether a block unit is predicted by an affine mode. In addition, the block unit is also refined according to an affine prediction refinement with optical flow (PROF) mode when the block-based affine flag indicates that the block unit is predicted by the affine mode. However, the coding efficiency is not always increased when the affine-predicted blocks are refined according to the affine PROF mode. In other words, the coding efficiency may decrease for some of the block units refined according to the affine PROF mode. Thus, the encoder and the decoder need to have more flags for the affine PROF mode. In addition, the selection of a syntax level of the affine PROF flag is critical to prevent the number of bits in the encoded data from increasing too much.

SUMMARY

The present disclosure is directed to a device and method for disabling an adjustment to an initial prediction result using several flags.

In a first aspect of the present disclosure, a method for decoding a bitstream by an electronic device is provided. The method comprises receiving encoded data, as part of the bitstream, for at least one image frame, wherein each of the at least one image frame includes one or more regions; determining a first affine flag from a sequence parameter set (SPS) associated with the at least one image frame when an affine mode is enabled in the at least one image frame, wherein the SPS is included in the encoded data and the affine mode includes a plurality of affine tools; determining that a second affine flag is present in the SPS when the first affine flag is equal to one; determining that a third affine flag is present in a slice header associated with a specific one of the one or more regions in a specific one of the at least one image frame when the second affine flag is equal to one, wherein the slice header is included in the encoded data, and the third affine flag corresponds to one of the plurality of affine tools; and reconstructing the specific one of the one or more regions based on a plurality of first candidate modes including the one of the plurality of affine tools when the third affine flag is equal to zero.

In a second aspect of the present disclosure, a method for decoding a bitstream by an electronic device is provided. The method comprises receiving encoded data, as part of the bitstream, for at least one image frame, wherein each of the at least one image frame includes one or more regions; determining a first affine flag from a sequence parameter set (SPS) associated with the at least one image frame when an affine mode is enabled in the at least one image frame, wherein the SPS is included in the encoded data and the affine mode includes a plurality of affine tools; determining, based on the first affine flag, whether a second affine flag is present in the SPS; determining, based on the second affine flag, whether a third affine flag is present in a slice header associated with a specific one of the one or more regions in a specific one of the at least one image frame, wherein the slice header is included in the encoded data, and the third affine flag corresponds to one of the plurality of affine tools; and reconstructing the specific one of the one or more regions based on a plurality of first candidate modes including the one of the plurality of affine tools when the third affine flag is equal to zero.

BRIEF DESCRIPTION OF THE DRAWINGS

Aspects of the disclosure are best understood from the following detailed description when read with the accompanying figures. Various features are not drawn to scale and dimensions of various features may be arbitrarily increased or reduced for clarity of discussion.

DETAILED DESCRIPTION

Figure 1:
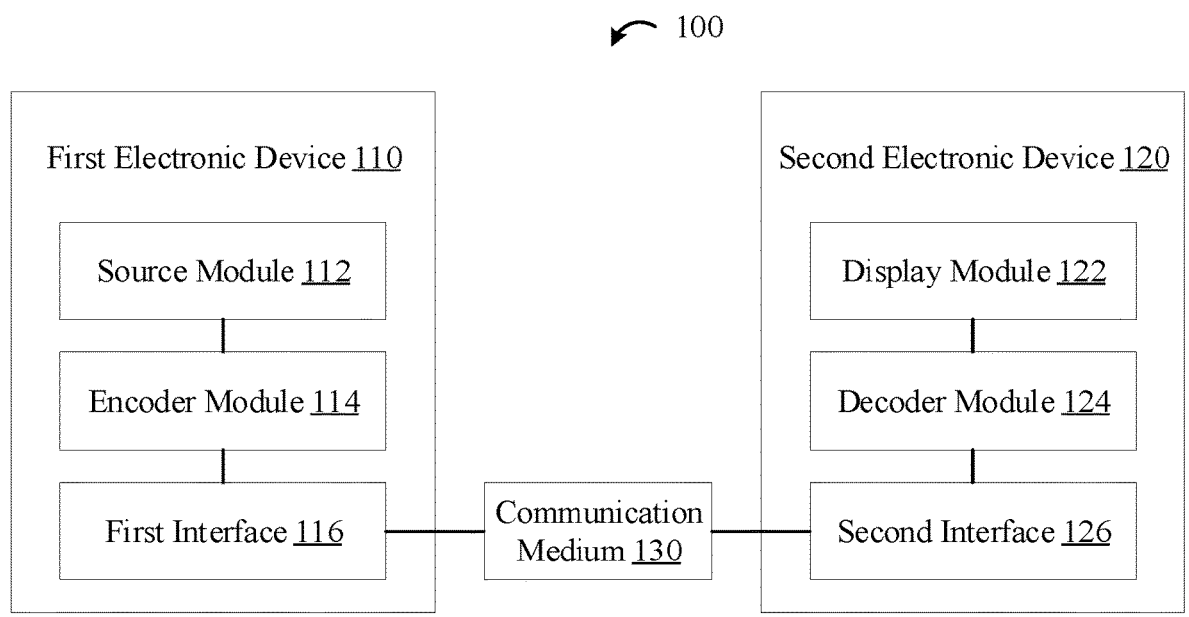
FIG. 1 illustrates a block diagram of an example system configured to encode and decode video data according to an example implementation of the present disclosure.

The following description contains specific information related to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art.

Unless noted otherwise, like or corresponding elements among the figures may be indicated by like or corresponding reference numerals. The drawings and illustrations in the present disclosure are generally not to scale and are not intended to correspond to actual relative dimensions.

For the purposes of consistency and ease of understanding, like features are identified (although, in some examples, not illustrated) by numerals in the exemplary figures. However, the features in different implementations may differ in other respects and shall not be narrowly confined to what is illustrated in the figures.

The description uses the phrases "in one implementation," or "in some implementations," which may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any disclosed coding function(s) or algorithm(s) described in the present disclosure may be implemented by hardware, software, or a combination of software and hardware. Described functions may correspond to modules that may be software, hardware, firmware, or any combination thereof.

A software implementation may include computer-executable instructions stored on computer-readable medium, such as memory or other type of storage devices. For example, one or more microprocessors or general-purpose computers with communication processing capability may be programmed with executable instructions and may perform the disclosed function(s) or algorithm(s).

The microprocessors or general-purpose computers may be formed of application-specific integrated circuits (ASICs), programmable logic arrays, and/or using one or more digital signal processors (DSPs). Although some of the disclosed implementations are oriented to software installed and executed on computer hardware, alternative implementations implemented as firmware, as hardware, or as a combination of hardware and software are well within the scope of the present disclosure. The computer-readable medium may include, but is not limited to, random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of an example system 100 configured to encode and decode video data according to an example implementation of the present disclosure. The system 100 includes a first electronic device 110, a second electronic device 120, and a communication medium 130. The first electronic device 110 may be a source device including any device configured to encode video data and transmit encoded video data to the communication medium 130. The second electronic device 120 may be a destination device including any device configured to receive encoded video data via the communication medium 130 and to decode encoded video data.

In some implementations, the first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

In some implementations, the first electronic device 110 and/or the second electronic device 120 may be a mobile phone, a tablet, a desktop, a notebook, or other electronic devices. FIG. 1 merely illustrates one example of the first electronic device 110 and the second electronic device 120. The first electronic device 110 and second electronic device 120 in other implementations may include more or fewer components than illustrated or have a different configuration of the various components.

In some implementations, the source module 112 may include a video capture device to capture a new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

In some implementations, the encoder module 114 and the decoder module 124 may each be implemented as any of a variety of suitable encoder/decoder circuitry such as one or more microprocessors, a central processing unit (CPU), a graphic processing unit (GPU), a system on chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store instructions for the software in a suitable, non-transitory computer-readable medium and execute the instructions in hardware using one or more processors to perform the disclosed methods. In some implementations, each of the encoder module 114 and the decoder module 124 may be included in one or more encoders or decoders, any of which may be integrated as part of a combined encoder/decoder (CODEC) in a device.

In some implementations, the first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In some implementations, the first interface 116 and the second interface 126 may each include any device configured to transmit and/or store a compliant video bitstream via the communication medium 130 and to receive the compliant video bitstream via the communication medium 130.

In some implementations, the first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C), or any other logical and physical structure that may be used to interconnect peer devices.

In some implementations, the display module 122 may include a display using liquid crystal display (LCD) technology, plasma display technology, organic light emitting diode (OLED) display technology, or light emitting polymer display (LPD) technology with other display technologies used in other implementations. The display module 122 may include a high-definition display or an ultra-high-definition display.

Figure 2:
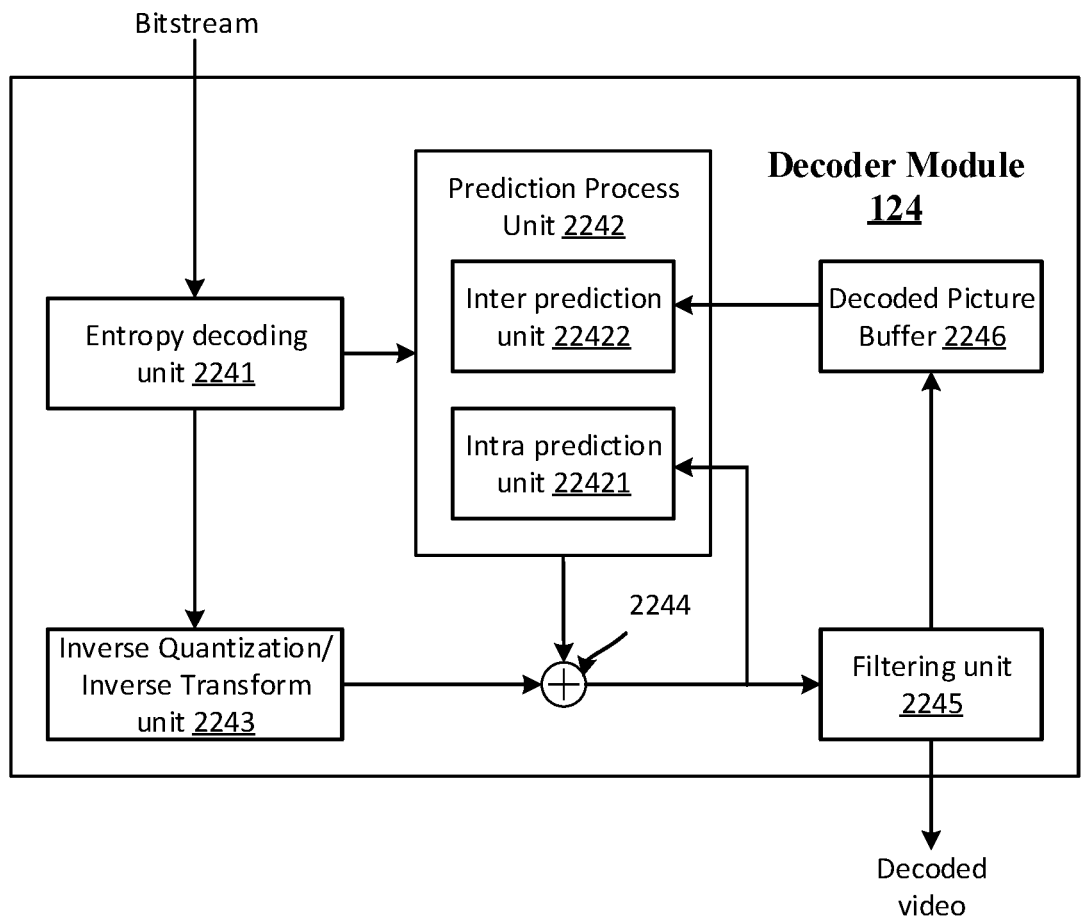
FIG. 2 illustrates a block diagram of an example decoder module of a second electronic device illustrated in FIG. 1 according to an example implementation of the present disclosure.

FIG. 2 illustrates a block diagram of an example decoder module 124 of the second electronic device 120 illustrated in FIG. 1, according to an example implementation of the present disclosure. The decoder module 124 includes an entropy decoder (e.g., an entropy decoding unit 2241), a prediction processor (e.g., a prediction process unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction process unit 2242 further includes an intra prediction processor (e.g., an intra prediction unit 22421) and an inter prediction processor (e.g., an inter prediction unit 22422). The decoder module 124 receives a bitstream and decodes the bitstream to output decoded video.

The entropy decoding unit 2241 may receive the bitstream including a plurality of syntax elements from the second interface 126 illustrated in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

In some implementations, the entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique to generate the quantized transform coefficients. In some implementations, the entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

In some implementations, the prediction process unit 2242 may receive syntax elements such as motion vectors, intra modes, partition information, and other syntax information from the entropy decoding unit 2241. The prediction process unit 2242 may receive the syntax elements including the partition information and divide image frames according to the partition information.

In some implementations, each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In some implementations, during the decoding process, the prediction process unit 2242 receives predicted data including the intra mode or the motion vector for a current image block of a specific one of the image frames. The current image block may be the luminance block or one of the chrominance blocks in the specific image frame.

In some implementations, the intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. In some implementations, the intra prediction unit 22421 may reconstruct a plurality of chroma components of the current block unit based on a plurality of luma components of the current block unit when the chroma components are reconstructed by the prediction process unit 2242.

In some implementations, the intra prediction unit 22421 may reconstruct a plurality of chroma components of the current block unit based on the plurality of luma components of the current block unit when the luma components of the current block are reconstructed by the prediction process unit 2242.

In some implementations, the inter prediction unit 22422 may perform inter-predictive coding of the current block unit relative to one or more blocks in one or more reference image blocks based on syntax elements related to the motion vector in order to generate the predicted block.

In some implementations, the motion vector may indicate a displacement of the current block unit within the current image block relative to a reference block unit within the reference image block. The reference block unit is a block determined to closely match the current block unit.

In some implementations, the inter prediction unit 22422 receives the reference image block stored in the decoded picture buffer 2246 and reconstructs the current block unit based on the received reference image block.

In some implementations, the inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

In some implementations, the inverse transformation may be inversely applied by the transformation process such as discrete cosine transform (DCT), discrete sine transform (DST), adaptive multiple transform (AMT), mode-dependent non-separable secondary transform (MDNSST), hyper-cube-givens transform (HyGT), signal dependent transform, Karhunen-Loeve transform (KLT), wavelet transform, integer transform, sub-band transform, or a conceptually similar transform.

In some implementations, the inverse transformation may convert the residual information from a transform domain, such as a frequency domain, back to the pixel domain. The degree of inverse quantization may be modified by adjusting a quantization parameter. The summer 2244 adds the residual block to the predicted block from the prediction process unit 2242 to produce a reconstructed block.

In some implementations, the summer 2244 adds the reconstructed residual block to the predicted block provided from the prediction process unit 2242 to produce a reconstructed block.

In some implementations, the filtering unit 2245 may include a deblocking filter, a sample adaptive offset (SAO) filter, a bilateral filter, and/or an adaptive loop filter (ALF) to remove blocking artifacts from the reconstructed block. Additional filters (in-loop or post-loop) may also be used in addition to the deblocking filter, the SAO filter, the bilateral filter and the ALF. Such filters are not illustrated for brevity but may filter the output of the summer 2244.

The filtering unit 2245 may output the decoded video to the display module 122 or other video receiving unit after the filtering unit 2245 performs the filtering process for the reconstructed blocks of the specific image frame.

In some implementations, the decoded picture buffer 2246 may be a reference picture memory that stores the reference block for use by the prediction process unit 2242 in decoding the bitstream (in inter-coding modes). The decoded picture buffer 2246 may be formed by any of a variety of memory devices such as dynamic random-access memory (DRAM), including synchronous DRAM (SDRAM), magneto-resistive RAM (MRAM), resistive RAM (RRAM), or other types of memory devices.

In some implementations, the decoded picture buffer 2246 may be on-chip with other components of the decoder module 124 or off-chip relative to those components.

Figure 3:
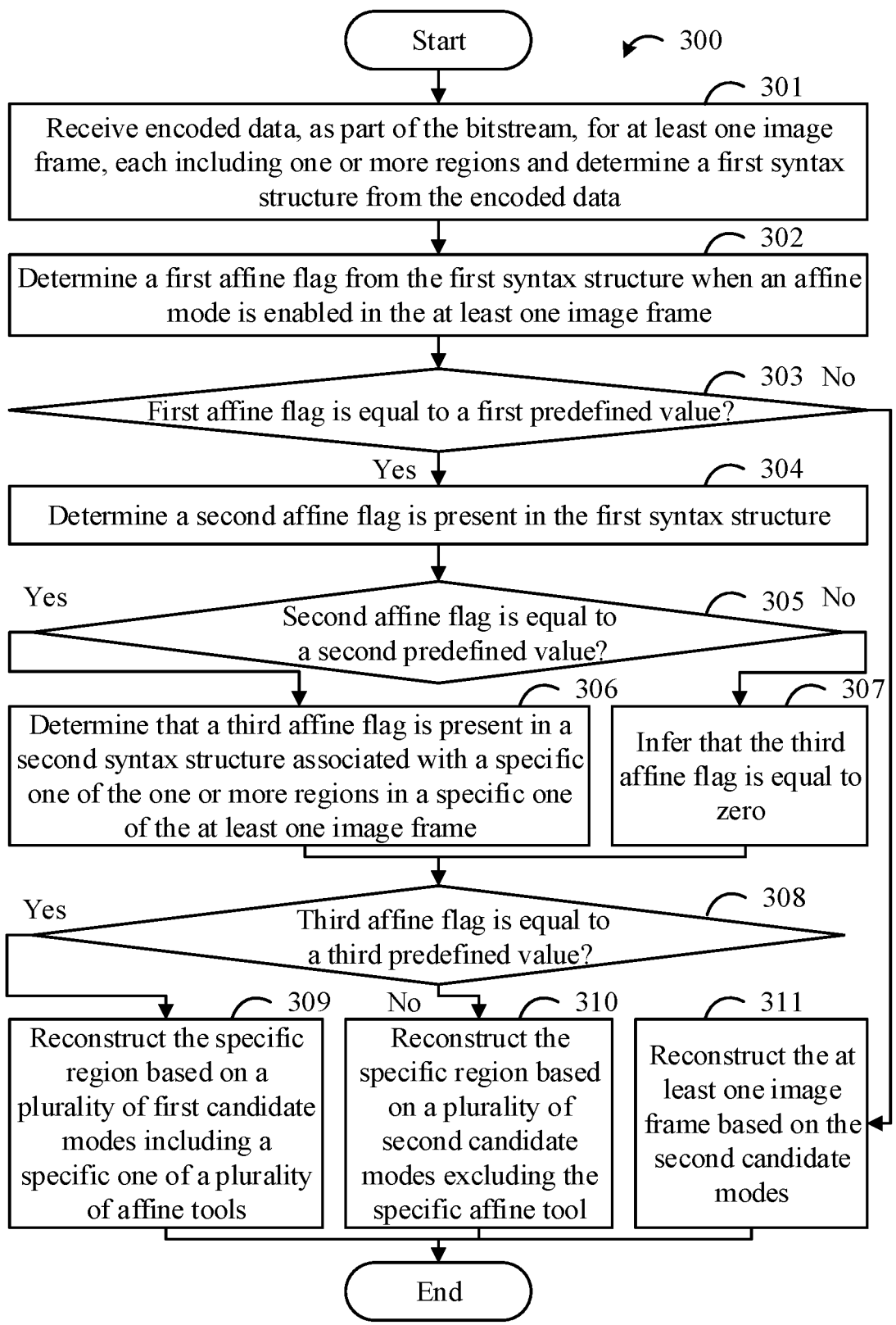
FIG. 3 illustrates a flowchart of an example reconstruction method for reconstructing a block unit according to an example implementation of the present disclosure.

FIG. 3 illustrates a flowchart of an example reconstruction method 300 for reconstructing a block unit according to an example implementation of the present disclosure. The method 300 is an example only as there are a variety of ways to perform the method.

The method 300 may be performed using the configurations illustrated in FIG. 1 and FIG. 2 and various elements of these figures are referenced in explaining the method 300. Each block illustrated in FIG. 3 may represent one or more processes, methods, or subroutines performed.

Furthermore, the order of blocks is illustrative only and may change. Additional blocks may be added or fewer blocks may be utilized without departing from the present disclosure.

At block 301, the decoder module 124 receives encoded data, as part of a bitstream, for at least one image frame, each including one or more regions and determines a first syntax structure from the encoded data.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124. The bitstream may include the encoded data corresponding to the at least one image frame. Each of the at least one image frame may be divided into one or more regions.

Figure 4A:
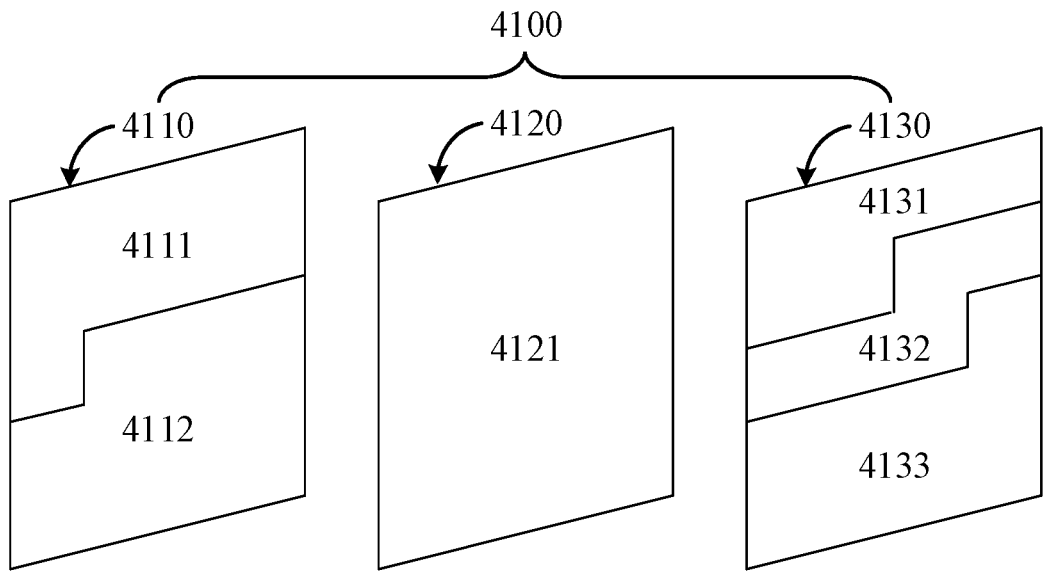
FIG. 4A illustrates an image group of three image frames having one or more regions, according to example implementations of the present disclosure.

FIG. 4A illustrates an image group of three image frames having one or more regions, according to example implementations of the present disclosure. In the implementation, the number of the at least one image frame 4110-4130 in an image group 4100 corresponding to the encoded data may be equal to three, the number of the one or more regions in the first image frame 4110 is equal to two, the number of the one or more regions in the second image frame 4120 is equal to one, and the number of the one or more regions in the third image frame 4130 is equal to three.

In some implementations, the encoded data may include the first syntax structure corresponding to the at least one image frame. In the implementation, the first syntax structure may include a plurality of first structure indications to indicate how to reconstruct the at least image frame. In some implementations, the first syntax structure may be one of a video parameter set (VPS), a sequence parameter set (SPS) and a picture parameter set (PPS).

In some implementations, the entropy decoding unit 2241 may decode the encoded data to determine the first structure indications for the at least one image frame and the decoder module 124 may further reconstruct the at least one image frame based on the first structure indications. The first structure indications may include a plurality of first structure flags and a plurality of first structure indices.

At block 302, the decoder module 124 determines a first affine flag from the first syntax structure when an affine mode is enabled in the at least one image frame.

In some implementations, with reference to FIG. 2, the decoder module 124 may determine an affine enabled flag from the first syntax structure. In the implementation, an affine mode may be enabled during reconstruction of the at least one image frame corresponding to the first syntax structure, when the affine enabled flag in the first syntax structure is equal to one. In some implementations, the affine mode may include a plurality of affine tools. Thus, the affine tools may be enabled during reconstruction of the at least one image frame, when the affine enabled flag is equal to one. In addition, the affine mode may be disabled for the at least one image frame, when the affine enabled flag in the first syntax structure is equal to zero. Thus, the at least one image frame is not reconstructed based on the affine tools when the affine enabled flag is equal to zero. In some implementations, the affine enabled flag may be a syntax element sps_affine_enabled_flag when the first syntax structure is the SPS.

In some implementations, the first affine flag may indicate whether a specific one of the affine tools is enabled for the at least one image frame when the affine mode is enabled in the at least one image frame according to the affine enabled flag. In the implementation, the first affine flag corresponds to the specific affine tool.

In some implementations, the specific affine tool may be an affine PROF mode. In addition, the first affine flag may be an affine PROF enabled flag indicating whether the affine PROF mode is enabled when the at least one image frame is reconstructed. In one implementation, the affine PROF enabled flag may be a syntax element sps_affine_prof_enabled_flag, when the first syntax structure is the SPS.

In some implementations, the specific affine tool may be an affine adaptive motion vector difference resolution (AMVR) mode. In addition, the first affine flag may be an affine AMVR enabled flag indicating whether the affine AMVR mode is enabled when the at least one image frame is reconstructed. In one implementation, the affine AMVR enabled flag may be a syntax element sps_affine_amvr_enabled_flag, when the first syntax structure is the SPS.

At block 303, the decoder module 124 determines whether the first affine flag is equal to a first predefined value. The method 300 may proceed to block 304 when the decoder module 124 determines that the first affine flag is equal to the first predefined value. The method may proceed to block 311 when the decoder module 124 determines that the first affine flag is different from the first predefined value.

In some implementations, with reference to FIG. 2, the decoder module 124 determines that the specific affine tool is enabled for the at least one image frame when the first affine flag is equal to the first predefined value. In addition, the decoder module 124 determines that the specific affine tool is disabled during reconstruction of the at least one image frame when the first affine flag is different from the first predefined value. In other words, the at least one image frame is not reconstructed based on the specific affine tool when the first affine flag is different from the first predefined value.

In some implementations, the first predefined value may be equal to one. Thus, the decoder module 124 determines that the specific affine tool is enabled for the at least one image frame when the first affine flag is equal to one. In addition, the decoder module 124 determines that the specific affine tool is disabled during reconstruction of the at least one image frame when the first affine flag is equal to zero.

At block 304, the decoder module 124 determines that a second affine flag is present in the first syntax structure.

In some implementations, with reference to FIG. 2, the decoder module 124 may determine that the first syntax structure includes the second affine flag when the first affine flag is equal to the first predefined value. Then, the decoder module 124 may determine the second affine flag from the first syntax structure when the first affine flag is equal to the first predefined value. In one implementation, the first predefined value is equal to one. Thus, the decoder module 124 may determine the second affine flag from the first syntax structure when the first affine flag is equal to one.

In some implementations, the second affine flag may indicate whether the encoded data further includes a plurality of secondary flags each indicating whether the specific affine tool is disabled during reconstruction of a specific one of the regions in a specific one of the at least one image frame when the specific affine tool is enabled in the at least one image frame according to the first affine flag. In the implementation, the second affine flag corresponds to the specific affine tool.

In some implementations, the specific affine tool may be the affine PROF mode. In addition, the second affine flag may be an affine PROF present flag indicating whether the encoded data further includes the secondary flag indicating whether the affine PROF mode is disabled during reconstruction of one of the regions included in one of the at least one image frame. In the implementation, the secondary flag corresponds to the one of the regions in the one of the at least one image frame. In another implementation, the second affine flag may be an affine AMVR present flag.

At block 305, the decoder module 124 determines whether the second affine flag is equal to a second predefined value. The method 300 may proceed to block 306 when the decoder module 124 determines that the second affine flag is equal to the second predefined value. The method may proceed to block 307 when the decoder module 124 determines that the second affine flag is different from the second predefined value.

In some implementations, with reference to FIG. 2, the decoder module 124 determines that the encoded data further includes the secondary flags each indicating whether the specific affine tool is disabled during reconstruction of the corresponding region when the second affine flag is equal to the second predefined value. In addition, the decoder module 124 determines that the encoded data does not include the secondary flags when the second affine flag is different from the second predefined value. In other words, the secondary flags are not parsed from the encoded data when the second affine flag is different from the second predefined value.

In some implementations, the second predefined value may be equal to one. Thus, the decoder module 124 determines that the encoded data further includes the secondary flags when the second affine flag is equal to one. In addition, the decoder module 124 determines that the secondary flags are not included in the encoded data when the second affine flag is equal to zero.

At block 306, the decoder module 124 determines that a third affine flag is present in a second syntax structure associated with a specific one of the one or more regions in a specific one of the at least one image frame.

In some implementations, each of the secondary flags is the third affine flag included in a corresponding one of a plurality of second syntax structures. In some implementations, the encoded data may include the first syntax structure and the second syntax structures. In addition, the number of the first syntax structure in the encoded data may be equal to one, and the number of the second syntax structures in the encoded data may be equal to the number of the regions included in the at least one image frame. In some implementations, with reference to FIG. 4A, the number of the first syntax structure corresponding to the image group 4100 is equal to one, and the number of the second syntax structures each corresponding to one of the regions 4111-4112, 4121, and 4131-4133 in the image group 4100 is equal to six.

Figure 4B:
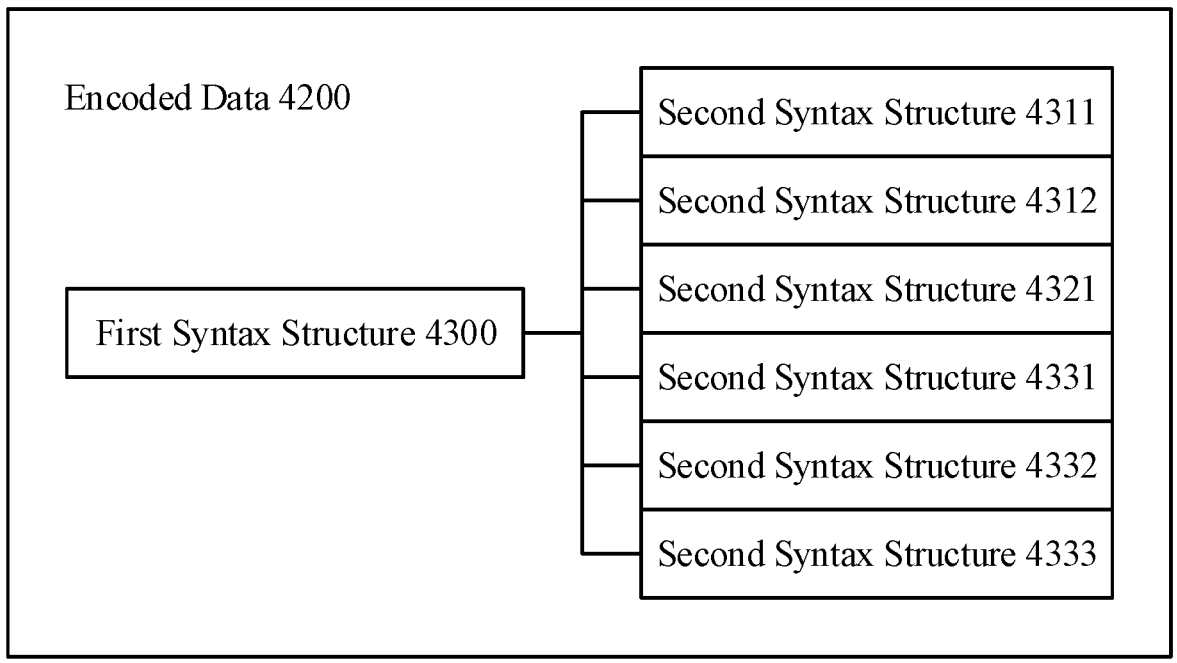
FIG. 4B illustrates syntax structures corresponding to the image group and image regions illustrated in FIG. 4A.

FIG. 4B illustrates syntax structures corresponding to the image group and image regions illustrated in FIG. 4A, specifically one first syntax structure corresponding to the image group 4100 and six second syntax structures corresponding to the six regions 4111-4112, 4121, and 4131-4133 in the image group 4100. In the implementation, each of the second syntax structures 4311-4312, 4321, and 4331-4333 corresponds to one of the regions 4111-4112, 4121, and 4131-4133 in the image group 4100. Thus, the number of the regions 4111-4112, 4121, and 4131-4133 in the image group 4100 may be equal to the number of the second syntax structures 4311-4312, 4321, and 4331-4333.

In some implementations, a first syntax level of the first syntax structure 4300 is higher than a second syntax level of the second syntax structures 4311-4312, 4321, and 4331-4333. In the implementation, each of the second syntax structures 4311-4312, 4321, and 4331-4333 may have a reference to the first syntax structure 4300, and the first syntax structure 4300 has no reference to the second syntax structures 4311-4312, 4321, and 4331-4333. For example, the second syntax structures 4311-4312, 4321, and 4331-4333 may be a slice header. In another example, the second syntax structure 4321 may be a picture header and there may be another two second syntax structures each corresponding to one of the image frames 4110 and 4130 in the encoded data 4200.

In some implementations, with reference to FIG. 2, the decoder module 124 determines that each of the second syntax structures includes one of the third affine flags when the second affine flag is equal to the second predefined value. Then, the decoder module 124 may determine the third affine flags from the second syntax structures when the second affine flag is equal to the second predefined value. In the implementation, each of the third affine flags may indicate whether the specific affine tool is disabled when a corresponding one of the regions is reconstructed. In one implementation, the second predefined value is equal to one. Thus, the decoder module 124 may determine one of the third affine flags from a corresponding one of second syntax structures corresponding to a specific one of the one or more regions in a specific one of the at least one image frame when the second affine flag is equal to one. For example, the decoder module 124 may determine one of the affine flags from the second syntax structure 4331 corresponding to the region 4131 of the third image frame 4130.

In some implementations, each of the third affine flags included in a corresponding one of the second syntax structures also corresponds to one of the regions in the at least one image frame, since each of the second syntax structures corresponds to one of the regions in the at least one image frame.

In some implementations, the third affine flags correspond to the specific affine tool, since the third affine flags indicate whether the specific affine tool is disabled in the regions in the at least one image frame.

In some implementations, the specific affine tool may be the affine PROF mode. In addition, each of the third affine flags may be an affine PROF disabled flag indicating whether the affine PROF mode is disabled when a corresponding one of the regions included in a corresponding one of the at least one image frame is reconstructed. In one implementation, the affine PROF disabled flag may be a syntax element ph_prof_disabled flag, when the second syntax structure is the picture header. In addition, the affine PROF present flag may be a syntax element sps_prof_control_present_inph_flag, when the first syntax structure is the SPS and the second syntax structure is the picture header. In the implementation, the second affine flag may be the affine present flag indicating whether the affine PROF disabled flags are included in the second syntax structures.

In some implementations, the specific affine tool may be the affine AMVR mode. In addition, each of the third affine flags may be an affine AMVR disabled flag. In the implementation, the second affine flag may be the affine present flag indicating whether the affine AMVR disabled flags are included in the second syntax structures.

At block 307, the decoder module 124 infers that the third affine flag is equal to zero.

In some implementations, with reference to FIG. 2, the decoder module 124 determines that the third affine flags are not present in the second syntax structures when the second affine flag is different from the second predefined value. Then, the decoder module 124 infers that the third affine flags for the regions in the at least one image frame are equal to zero when the third affine flags are not present in the second syntax structures and the second affine flag is present in the first syntax structure.

In some implementations, the second predefined value may be equal to one. Thus, the decoder module 124 determines that the third affine flags are not parsed from the second syntax structures when the second affine flag is equal to zero. In addition, the third affine flags are inferred to be equal to zero when the second affine flag is equal to zero and the second affine flag is present in the first syntax structure.

At block 308, the decoder module 124 determines whether the third affine flag is equal to a third predefined value. The method 300 may proceed to block 309 when the decoder module 124 determines that the third affine flag is equal to the third predefined value. The method may proceed to block 310 when the decoder module 124 determines that the third affine flag is different from the third predefined value.

In some implementations, with reference to FIG. 2, the decoder module 124 determines that the specific affine tool is enabled in a specific one of the regions when the third affine flag corresponding to the specific region is equal to the third predefined value. In addition, the decoder module 124 determines that the specific affine tool is disabled in the specific region when the third affine flag corresponding to the specific region is different from the third predefined value. In other words, the specific region may not be reconstructed based on the specific affine tool when the third affine flag is different from the third predefined value.

In some implementations, the third predefined value may be equal to zero. Thus, the decoder module 124 determines that the specific affine tool is enabled for the specific region when the third affine flag is equal to zero. In addition, the decoder module 124 determines that the specific affine tool is disabled in the specific region when the third affine flag is equal to one.

At block 309, the decoder module 124 reconstructs the specific region based on a plurality of first candidate modes including a specific one of a plurality of affine tools.

In some implementations, with reference to FIG. 2, the decoder module 124 may determine that the specific affine tool is enabled in the specific region when the third affine flag corresponding to the specific region is equal to the third predefined value. Thus, the specific region may be reconstructed based on the first candidate mode including the specific affine tool when the third affine flag is equal to the third predefined value.

In some implementations, the specific affine tool is the affine PROF mode, and the third predefined value is equal to zero. In the implementation, the decoder module 124 may determine that the affine PROF mode is enabled in the specific region when the third affine PROF disabled flag is equal to zero. Thus, the decoder module 124 may determine, from a third syntax structure, a block flag for a block unit included in the specific region. The block flag indicates whether the block unit is predicted by the affine mode. When the block flag is equal to one, the decoder module 124 may determine that the block unit is predicted by the affine mode. Thus, the decoder module 124 may predict the block unit based on the affine mode to generate the prediction block, and then refine the prediction block according to the affine PROF mode. In the implementation, the decoder module 124 may reconstruct the block unit by adding the refined block into a residual block of the block unit determined from the bitstream.

In some implementations, the third syntax structure is a block-based syntax corresponding to the block unit. Thus, the third syntax structure is different from the first syntax structure and the second syntax structure, and a third syntax level of the third syntax structure is lower than the first syntax level and the second syntax level.

In some implementations, the decoder module 124 may determine that the block unit is not predicted by the affine mode when the block flag is equal to zero. Thus, the decoder module 124 may predict the block unit based on another prediction mode different from the affine mode to generate the prediction block. Then, the prediction block is not refined according to the affine PROF mode. In the implementation, the decoder module 124 may reconstruct the block unit by adding the prediction block into the residual block of the block unit determined from the bitstream.

At block 310, the decoder module 124 reconstructs the specific region based on a plurality of second candidate modes excluding the specific affine tool.

In some implementations, with reference to FIG. 2, the decoder module 124 may determine that the specific affine tool is disabled in the specific region when the third affine flag corresponding to the specific region is different from the third predefined value. Thus, the specific region may be reconstructed based on the second candidate modes excluding the specific affine tool when the third affine flag is different from the third predefined value. In one implementation, the third predefined value is equal to zero. In the implementation, the decoder module 124 may determine that the specific affine tool is disabled in the specific region when the third affine flag is equal to one. In addition, the specific region may be reconstructed based on the second candidate modes. In the implementation, the specific affine tool is excluded from the first candidate modes to generate the second candidate modes.

In some implementations, the specific affine tool is the affine PROF mode, and the third affine flag is the affine PROF disabled flag. In the implementation, the decoder module 124 may determine that the affine PROF mode is disabled in the specific region when the third affine PROF disabled flag is equal to one. Thus, the decoder module 124 may determine that a plurality of prediction blocks for a plurality of block units in the specific region are not refined according to the affine PROF mode when the specific region is reconstructed. In the implementation, the specific region is reconstructed based on the second candidate modes excluding the affine PROF mode. In the implementation, the affine PROF mode is excluded from the first candidate modes to generate the second candidate modes. For example, the decoder module 124 may predict one block unit in the specific region to generate one prediction block based on the affine mode without further refining the prediction block according to the affine PROF mode, and then directly add the prediction block into the residual block of the block unit to reconstruct the block unit.

At block 311, the decoder module 124 reconstructs the at least one image frame based on the second candidate modes.

In some implementations, with reference to FIG. 2, the decoder module 124 may determine that the specific affine tool is disabled in the at least one image frame when the first affine flag is different from the first predefined value. Thus, the at least one image frame may be reconstructed based on the second candidate modes excluding the specific affine tool when the first affine flag is different from the first predefined value. In one implementation, the first predefined value is equal to one. In the implementation, the decoder module 124 may determine that the specific affine tool is disabled in the at least one image frame when the first affine flag is equal to zero. In addition, the at least one image frame may be reconstructed based on the second candidate modes when the first affine flag is equal to zero.

In some implementations, the specific affine tool is the affine PROF mode, and the first affine flag is the affine PROF enabled flag. In the implementation, the decoder module 124 may determine that the affine PROF mode is disabled in the at least one image frame when the first affine PROF enabled flag is equal to zero. Thus, the decoder module 124 may determine that the prediction blocks for the block units in the at least one image frame are not refined according to the affine PROF mode when the at least one image frame is reconstructed. In the implementation, the at least one image frame is reconstructed based on the second candidate modes excluding the affine PROF mode. In the implementation, the affine PROF mode is excluded from the first candidate modes to generate the second candidate modes. For example, the decoder module 124 may predict one block unit in the specific region to generate one prediction block based on the affine mode without further refining the prediction block according to the affine PROF mode, and then directly add the prediction block into the residual block of the block unit to reconstruct the block unit.

In some implementations, with reference to FIG. 2, the decoder module 124 determines that the second affine flag is not present in the first syntax structure when the first affine flag is different from the first predefined value. Then, the decoder module 124 infers that the second affine flag for the at least one image frame is equal to zero when the second affine flags are not present in the first syntax structures. In the implementation, the third affine flags are not present in the second syntax structure, since the second affine flag is inferred to be equal to zero. Thus, the third affine flags are not parsed from the second syntax structures. In the implementation, the decoder module 124 may infer that the third affine flags are equal to one for disabling the specific affine mode since the first affine flag is different from the first predefined value for indicating that the specific affine mode is disabled in the at least one image frame.

In some implementations, the specific affine tool is the affine PROF mode and the first affine flag is the affine PROF enabled flag. Thus, the decoder module 124 determines that the second affine flag is not parsed from the first syntax structure when the affine PROF enabled flag is equal to zero. In addition, the second affine flags are inferred to be equal to zero when the affine PROF enabled flag is equal to zero. Then, the decoder module 124 infers that the second affine flag for the at least one image frame is equal to zero when the second affine flags are not present in the first syntax structures. In the implementation, the third affine flags are not present in the second syntax structure, since the second affine flag is inferred to be equal to zero. Thus, the third affine flags are not parsed from the second syntax structures. In the implementation, the decoder module 124 may infer that the third affine flags are equal to one for disabling the specific affine mode since the affine PROF enabled flag is equal to zero for indicating that the affine PROF mode is disabled in the at least one image frame.

Figure 5:
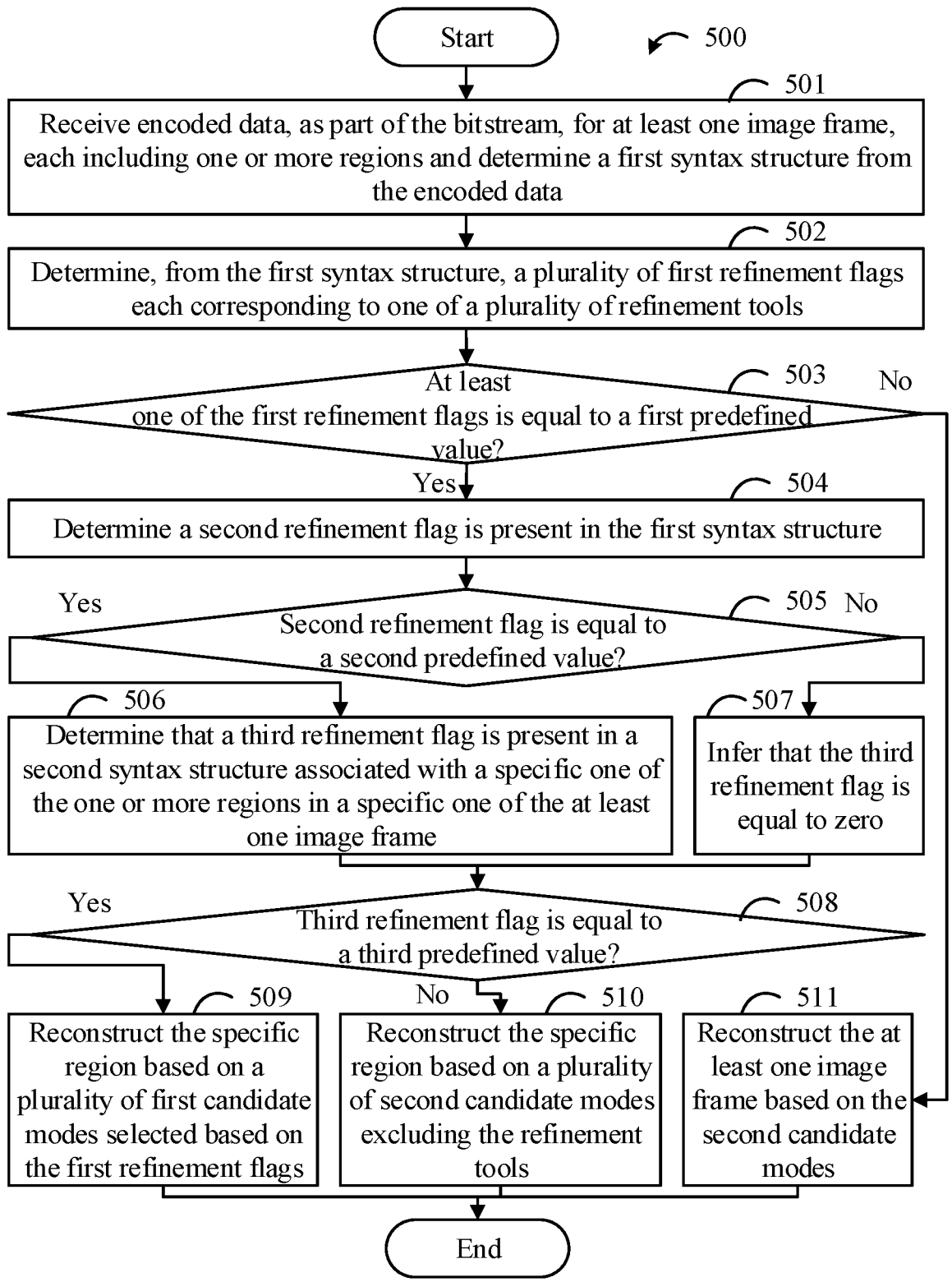
FIG. 5 illustrates a flowchart of another example reconstruction method for reconstructing a block unit according to an example implementation of the present disclosure.

FIG. 5 illustrates a flowchart of another example reconstruction method 500 for reconstructing a block unit according to an example implementation of the present disclosure. The method 500 is an example only as there are a variety of ways to perform the method.

The method 500 may be performed using the configurations illustrated in FIG. 1 and FIG. 2 and various elements of these figures are referenced in explaining the method 500. Each block illustrated in FIG. 5 may represent one or more processes, methods, or subroutines performed.

Furthermore, the order of blocks is illustrative only and may change. Additional blocks may be added or fewer blocks may be utilized without departing from the present disclosure.

At block 501, the decoder module 124 receives encoded data, as part of a bitstream, for at least one image frame, each including one or more regions and determines a first syntax structure from the encoded data.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124. The bitstream may include the encoded data corresponding to the at least one image frame. Each of the at least one image frame may be divided into one or more regions.

In some implementations, the encoded data may include the first syntax structure corresponding to the at least one image frame. In the implementation, the first syntax structure may include a plurality of first structure indications to indicate how to reconstruct the at least image frame. In some implementations, the first syntax structure may be one of a VPS, an SPS and a PPS.

In some implementations, the entropy decoding unit 2241 may decode the encoded data to determine the first structure indications for the at least one image frame and the decoder module 124 may further reconstruct the at least one image frame based on the first structure indications. The first structure indications may include a plurality of first structure flags and a plurality of first structure indices.

At block 502, the decoder module 124 determines, from the first syntax structure, a plurality of first refinement flags each corresponding to one of a plurality of refinement tools.

In some implementations, each of the first refinement flags may indicate whether a corresponding one of refinement tools is enabled for the at least one image frame. In some implementations, the refinement tools may include more than one of a bi-directional optical flow (BDOF) mode, a decoder motion vector refinement (DMVYR) mode, an affine PROF mode, and other prediction refinement modes. In addition, each of the first refinement flags may be a refinement enabled flag indicating whether a corresponding one of the refinement tools is enabled when the at least one image frame is reconstructed. In one implementation, each of the refinement enabled flags may be a syntax element sps_refinement_enabled_flag, when the first syntax structure is the SPS. For example, the refinement enabled flags may include more than one of a syntax element sps_bdof_enabled_flag, a syntax element sps_dmvr_enabled_flag, syntax element sps_affine_prof_enabled_flag.

At block 503, the decoder module 124 determines whether at least one of the first refinement flags is equal to a first predefined value. The method 500 may proceed to block 504 when the decoder module 124 determines that one or more of the first refinement flags are equal to the first predefined value. The method may proceed to block 511 when the decoder module 124 determines that each of the first refinement flags is different from the first predefined value.

In some implementations, with reference to FIG. 2, the decoder module 124 determines that at least one of the refinement tools is enabled for the at least one image frame when at least one of the first refinement flags is equal to the first predefined value. In addition, the decoder module 124 determines that all the refinement tools are disabled during reconstruction of the at least one image frame when each of the first refinement flags is different from the first predefined value. In other words, the at least one image frame is not reconstructed based on the refinement tools when the first refinement flags are different from the first predefined value.

In some implementations, the first predefined value may be equal to one. Thus, the decoder module 124 determines that one of the refinement tools is enabled for the at least one image frame when one of the first refinement flags is equal to one. In addition, the decoder module 124 determines that the refinement tools are disabled during reconstruction of the at least one image frame when all of the first refinement flags are equal to zero.

At block 504, the decoder module 124 determines that a second refinement flag is present in the first syntax structure.

In some implementations, with reference to FIG. 2, the decoder module 124 may determine that the first syntax structure includes the second refinement flag when at least one of the first refinement flags is equal to the first predefined value. Then, the decoder module 124 may determine the second refinement flag from the first syntax structure. In one implementation, the first predefined value is equal to one. Thus, the decoder module 124 may determine the second refinement flag from the first syntax structure when at least one of the first refinement flags is equal to one.

In some implementations, the second refinement flag may indicate whether the encoded data further includes a plurality of secondary flags each indicating whether all of the refinement tools are disabled during reconstruction of a corresponding one of the regions in the at least one image frame when at least one of the refinement tools is enabled in the at least one image frame according to the first refinement flags.

In some implementations, the second refinement flag may be a refinement present flag indicating whether the encoded data further includes the secondary flag indicating whether the refinement tools are disabled during reconstruction of one of the regions included in the at least one image frame. In the implementation, the secondary flag corresponds to the one of the regions in the at least one image frame.

At block 505, the decoder module 124 determines whether the second refinement flag is equal to a second predefined value. The method 500 may proceed to block 506 when the decoder module 124 determines that the second refinement flag is equal to the second predefined value. The method may proceed to block 507 when the decoder module 124 determines that the second refinement flag is different from the second predefined value.

In some implementations, with reference to FIG. 2, the decoder module 124 determines that the encoded data further includes the secondary flags each indicating whether all of the refinement tools are disabled during reconstruction of the corresponding region when the second refinement flag is equal to the second predefined value. In addition, the decoder module 124 determines that the encoded data does not include the secondary flags when the second refinement flag is different from the second predefined value. In other words, the secondary flags are not parsed from the encoded data when the second refinement flag is different from the second predefined value.

In some implementations, the second predefined value may be equal to one. Thus, the decoder module 124 determines that the encoded data further includes the secondary flags each corresponding to one of the one or more regions in the at least one image frame when the second refinement flag is equal to one. In addition, the decoder module 124 determines that the secondary flags are not included in the encoded data when the second refinement flag is equal to zero.

At block 506, the decoder module 124 determines that a third refinement flag is present in a second syntax structure associated with a specific one of the one or more regions in a specific one of the at least one image frame.

In some implementations, each of the secondary flags is the third refinement flag included in a corresponding one of a plurality of second syntax structures. In some implementations, the encoded data may include the first syntax structure and the second syntax structures. In addition, the number of the first syntax structure in the encoded data may be equal to one, and the number of the second syntax structures in the encoded data may be equal to the number of the regions included in the at least one image frame.

In some implementations, with reference to FIGS. 4A and 4B, the number of the first syntax structure corresponding to the image group 4100 is equal to one, and the number of the second syntax structures each corresponding to one of the regions 4111-4112, 4121, and 4131-4133 in the image group 4100 is equal to six. In the implementation, each of the second syntax structures 4311-4312, 4321, and 4331-4333 corresponds to one of the regions 4111-4112, 4121, and 4131-4133 in the image group 4100. Thus, the number of the regions 4111-4112, 4121, and 4131-4133 in the image group 4100 may be equal to the number of the second syntax structures 4311-4312, 4321, and 4331-4333.

In some implementations, a first syntax level of the first syntax structure 4300 is higher than a second syntax level of the second syntax structures 4311-4312, 4321, and 4331-4333. In the implementation, each of the second syntax structures 4311-4312, 4321, and 4331-4333 may have a reference to the first syntax structure 4300, and the first syntax structure 4300 has no reference to the second syntax structures 4311-4312, 4321, and 4331-4333. For example, each of the second syntax structures 4311-4312, 4321, and 4331-4333 may be a picture header. In another example, each of the second syntax structures 4311-4312, 4321, and 4331-4333 may be a slice header.

In some implementations, with reference to FIG. 2, the decoder module 124 determines that each of the second syntax structures includes one of the third refinement flags when the second refinement flag is equal to the second predefined value. Then, the decoder module 124 may determine the third refinement flags from the second syntax structures when the second refinement flag is equal to the second predefined value. In the implementation, each of the third refinement flags may indicate whether all the refinement tools are disabled when a corresponding one of the regions is reconstructed. In one implementation, the second predefined value is equal to one. Thus, the decoder module 124 may determine one of the third refinement flags from a corresponding one of second syntax structures corresponding to a specific one of the one or more regions in a specific one of the at least one image frame when the second refinement flag is equal to one. For example, the decoder module 124 may determine one of the refinement flags from the second syntax structures 4331 corresponding to the region 4131 of the third image frame 4130.

In some implementations, each of the third refinement flags included in a corresponding one of the second syntax structures also corresponds to one of the regions in the at least one image frame, since each of the second syntax structures corresponds to one of the regions in the at least one image frame.

In some implementations, each of the third refinement flags corresponds to all the refinement tools since each of the third refinement flags indicates whether all the refinement tools are disabled in a corresponding one of the regions in the at least one image frame.

In some implementations, each of the third refinement flags may be a refinement disabled flag indicating whether all the refinement tools are disabled when a corresponding one of the regions included in a corresponding one of the at least one image frame is reconstructed. In one implementation, the refinement disabled flag may be a syntax element ph refinement_disabled_flag, when the second syntax structure is the picture header. In addition, the refinement present flag may be a syntax element sps_refinement_control_present_in ph flag, when the first syntax structure is the SPS and the second syntax structure is the picture header. In the implementation, the second refinement flag may be the refinement present flag indicating whether the refinement disabled flags are included in the second syntax structures.

At block 507, the decoder module 124 infers that the third refinement flag is equal to zero.

In some implementations, with reference to FIG. 2, the decoder module 124 determines that the third refinement flags are not present in the second syntax structures when the second refinement flag is different from the second predefined value. Then, the decoder module 124 infers that the third refinement flags for the regions in the at least one image frame are equal to zero when the third refinement flags are not present in the second syntax structures and the second refinement flag is present in the first syntax structure.

In some implementations, the second predefined value may be equal to one. Thus, the decoder module 124 determines that the third refinement flags are not parsed from the second syntax structures when the second refinement flag is equal to zero. In addition, the third refinement flags are inferred to be equal to zero when the second refinement flag is equal to zero and the second refinement flag is present in the first syntax structure.

At block 508, the decoder module 124 determines whether the third refinement flag is equal to a third predefined value. The method 500 may proceed to block 509 when the decoder module 124 determines that the third refinement flag is equal to the third predefined value. The method may proceed to block 510 when the decoder module 124 determines that the third refinement flag is different from the third predefined value.

In some implementations, with reference to FIG. 2, the decoder module 124 determines that at least one of the refinement tools is enabled in a specific one of the regions when the third refinement flag corresponding to the specific region is equal to the third predefined value. In addition, the decoder module 124 determines that all the refinement tools are disabled in the specific region when the third refinement flag corresponding to the specific region is different from the third predefined value. In other words, the specific region may not be reconstructed based on the refinement tools when the third refinement flag is different from the third predefined value.

In some implementations, the third predefined value may be equal to zero. Thus, the decoder module 124 determines that at least one of the refinement tools is enabled for the specific region when the third refinement flag is equal to zero. In addition, the decoder module 124 determines that all the refinement tools are disabled in the specific region when the third refinement flag is equal to one.

At block 509, the decoder module 124 reconstructs the specific region based on a plurality of first candidate modes selected based on the first refinement flags.

In some implementations, with reference to FIG. 2, the decoder module 124 may determine that at least one of the refinement tools is enabled in the specific region when the third refinement flag corresponding to the specific region is equal to the third predefined value. Thus, the specific region may be reconstructed based on the first candidate mode including the at least one of the refinement tools when the third refinement flag is equal to the third predefined value. In some implementations, the at least one of the refinement tools may be selected from the refinement tools based on the first refinement flags. For example, a specific one of the refinement tools indicated by a specific one of the first refinement flags may be added into the first candidate modes when the specific first refinement flag is equal to the first predefined value. In addition, the specific refinement tool may be excluded from the first candidate modes when the specific first refinement flag is different from the first predefined value.

In some implementations, the third predefined value is equal to zero. In the implementation, the decoder module 124 may determine that the at least one of the refinement tools is enabled in the specific region when the refinement disabled flag is equal to zero. Then, the decoder module 124 may determine, from a third syntax structure, a plurality of block flags for a block unit included in the specific region. The block flags indicate whether a prediction block of the block unit is refined according to a specific one of the refinement tools.

For example, the first candidate mode may include the affine PROF mode when the first refinement flag for the affine PROF mode is equal to the first predefine value. Thus, the third syntax structure may include a specific one of the block flags corresponding to the affine PROF mode when the third refinement flag is equal to the third predefined value. In some implementations, the specific block flag corresponding to the affine PROF mode is an affine flag. When the affine flag of the block unit is equal to one, the decoder module 124 may determine that the block unit is predicted by the affine mode. Then, the decoder module 124 may predict the block unit based on the affine mode to generate the prediction block, and then refine the prediction block according to the affine PROF mode. In addition, the block flags corresponding to the BDOF mode are two list flags. When the two list flags of the block unit are equal to one, the decoder module 124 may determine that the block unit is predicted based on two reference frames. In the implementation, the decoder module 124 may predict the block unit based on the two reference frames to generate the prediction block, and then refine the prediction block according to the BDOF mode. In at least implementation, the decoder module 124 may reconstruct the block unit based on the refined block by adding the refined block into a residual block of the block unit determined from the bitstream.

In some implementations, the third syntax structure is a block-based syntax corresponding to the block unit. Thus, the third syntax structure is different from the first syntax structure and the second syntax structure, and a third syntax level of the third syntax structure is lower than the first syntax level and the second syntax level.

In some implementations, the decoder module 124 may determine that the block unit is not reconstructed by a specific one of the refinement tools when the specific block flag corresponding to the specific refinement tool is equal to zero. Thus, the decoder module 124 may reconstruct the block unit based on another prediction mode different from the specific refinement tool to directly generate the prediction block without refining according to the specific refinement tool. In the implementation, the decoder module 124 may reconstruct the block unit based on the prediction block by adding the prediction block into the residual block of the block unit determined from the bitstream.

At block 510, the decoder module 124 reconstructs the specific region based on a plurality of second candidate modes excluding the refinement tools.

In some implementations, with reference to FIG. 2, the decoder module 124 may determine that all the refinement tools are disabled in the specific region when the third refinement flag corresponding to the specific region is different from the third predefined value. Thus, the specific region may be reconstructed based on the second candidate modes excluding the refinement tools when the third refinement flag is different from the third predefined value. In one implementation, the third predefined value is equal to zero. In the implementation, the decoder module 124 may determine that all the refinement tools are disabled in the specific region when the third refinement flag is equal to one. In addition, the specific region may be reconstructed based on the second candidate modes. In the implementation, the refinement tools are excluded from the first candidate modes to generate the second candidate modes.

In some implementations, the third refinement flag is the refinement disabled flag. In the implementation, the decoder module 124 may determine that all the refinement tools are disabled in the specific region when the refinement disabled flag is equal to one. Thus, the decoder module 124 may determine that a plurality of prediction blocks for a plurality of block units in the specific region are not refined according to the refinement tools when the specific region is reconstructed. In the implementation, the specific region is reconstructed based on the second candidate modes excluding the refinement tools. In the implementation, the refinement tools are excluded from the first candidate modes to generate the second candidate modes. For example, the decoder module 124 may predict one block unit in the specific region to generate one prediction block without further refining the prediction block according to the refinement tools, and then directly add the prediction block into a residual block of the block unit to reconstruct the block unit.

At block 511, the decoder module 124 reconstructs the at least one image frame based on the second candidate modes.

In some implementations, with reference to FIG. 2, the decoder module 124 may determine that all the refinement tools are disabled in the at least one image frame when each of the first refinement flags is different from the first predefined value. Thus, the at least one image frame may be reconstructed based on the second candidate modes excluding the refinement tools when the first refinement flags are different from the first predefined value. In one implementation, the first predefined value is equal to one. In the implementation, the decoder module 124 may determine that the refinement tools are disabled in the at least one image frame when the first refinement flags are equal to zero. In addition, the at least one image frame may be reconstructed based on the second candidate modes when the first refinement flags are equal to zero.

In some implementations, the first refinement flags are the refinement enabled flags. In the implementation, the decoder module 124 may determine that the refinement tools are disabled in the at least one image frame when the refinement enabled flags are equal to zero. Thus, the decoder module 124 may determine that a plurality of prediction blocks for a plurality of block units in the at least one image frame is not refined according to the refinement tools when the at least one image frame is reconstructed. In the implementation, the at least one image frame is reconstructed based on the second candidate modes excluding the refinement tools. In the implementation, the refinement tools are excluded from the first candidate modes to generate the second candidate modes. For example, the decoder module 124 may predict one block unit in the at least one image frame to generate one prediction block, and then directly add the prediction block into a residual block of the block unit to reconstruct the block unit.

In some implementations, with reference to FIG. 2, the decoder module 124 determines that the second refinement flag is not present in the first syntax structure when the first refinement flags are different from the first predefined value. Then, the decoder module 124 infers that the second refinement flag for the at least one image frame is equal to zero when the second refinement flags are not present in the first syntax structures. In the implementation, the third refinement flags are not present in the second syntax structure, since the second refinement flag is inferred to be equal to zero. Thus, the third refinement flags are not parsed from the second syntax structures. In the implementation, the decoder module 124 may infer that the third refinement flags are equal to one for disabling all the refinement tools since the first refinement flags are different from the first predefined value for indicating that all the refinement tools are disabled in the at least one image frame.

In some implementations, the first refinement flags are the refinement enabled flag. In the implementation, the decoder module 124 may infer that the third refinement flags are equal to one for disabling all the refinement tools since the refinement enabled flags are equal to zero for indicating that all the refinement tools are disabled in the at least one image frame.

Figure 6:
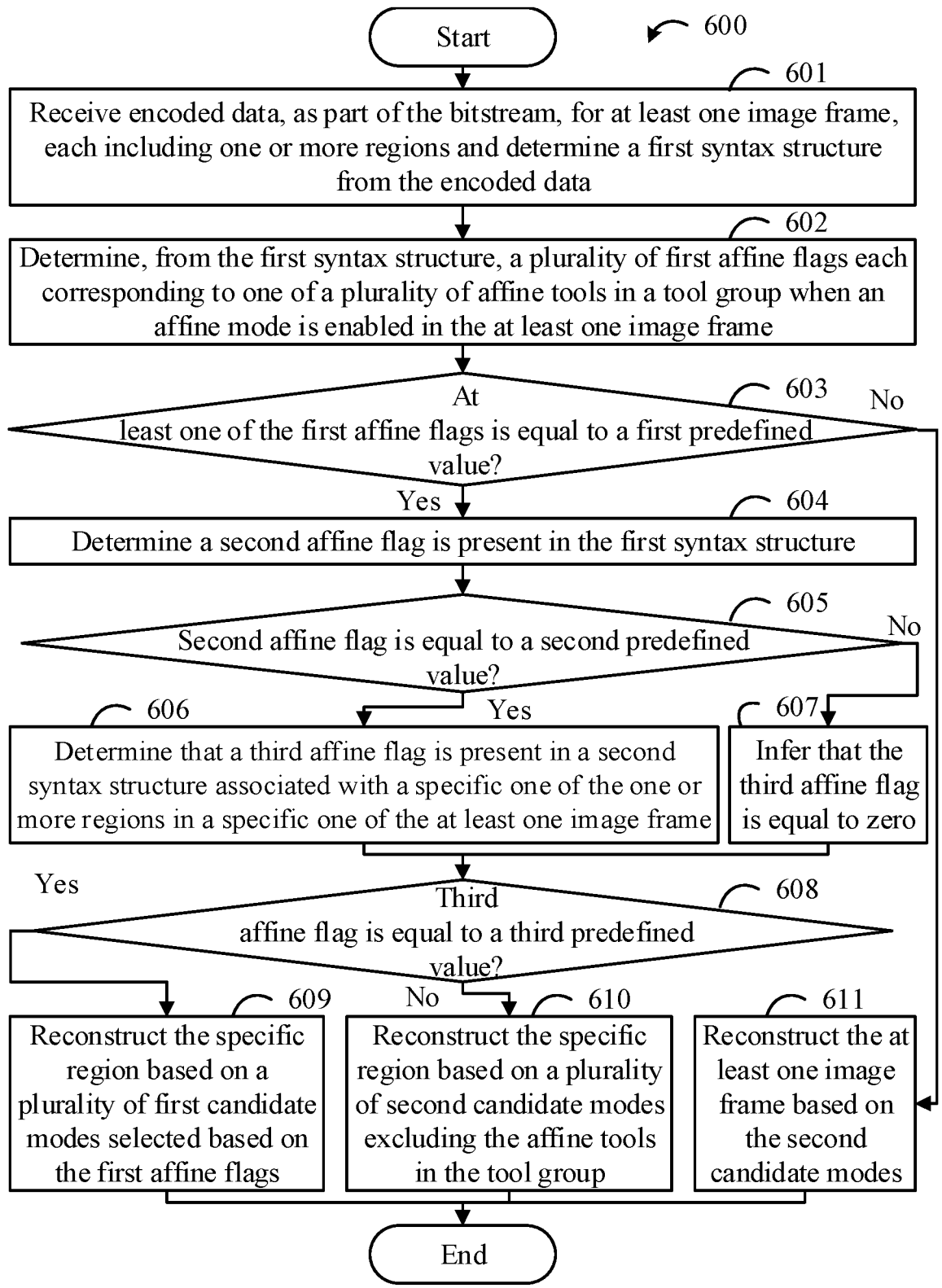
FIG. 6 illustrates a flowchart of another example reconstruction method for reconstructing a block unit according to an example implementation of the present disclosure.

FIG. 6 illustrates a flowchart of another example reconstruction method 600 for reconstructing a block unit according to an example implementation of the present disclosure. The method 600 is an example only as there are a variety of ways to perform the method.

The method 600 may be performed using the configurations illustrated in FIG. 1 and FIG. 2 and various elements of these figures are referenced in explaining the method 600. Each block illustrated in FIG. 6 may represent one or more processes, methods, or subroutines performed.

Furthermore, the order of blocks is illustrative only and may change. Additional blocks may be added or fewer blocks may be utilized without departing from the present disclosure.

At block 601, the decoder module 124 receives encoded data, as part of a bitstream, for at least one image frame, each including one or more regions and determines a first syntax structure from the encoded data.

With reference to FIG. 1 and FIG. 2, the second electronic device 120 may receive the bitstream from an encoder, such as the first electronic device 110, or other video providers via the second interface 126. The bitstream may include the encoded data corresponding to the at least one image frame. Each of the at least one image frame may be divided into one or more regions.

In some implementations, the encoded data may include the first syntax structure corresponding to the at least one image frame. In some implementations, the first syntax structure may be one of a VPS, an SPS and a PPS.

At block 602, the decoder module 124 determines, from the first syntax structure, a plurality of first affine flags each corresponding to one of a plurality of affine tools in a tool group when an affine mode is enabled in the at least one image frame.

In some implementations, with reference to FIG. 2, the decoder module 124 may determine an affine enabled flag from the first syntax structure. In the implementation, the affine mode may be enabled during reconstruction of the at least one image frame corresponding to the first syntax structure, when the affine enabled flag in the first syntax structure is equal to one. In some implementations, the affine mode may include a plurality of affine tools. Thus, the affine tools may be enabled during reconstruction of the at least one image frame, when the affine enabled flag is equal to one. In addition, the affine mode may be disabled for the at least one image frame, when the affine enabled flag in the first syntax structure is equal to zero. Thus, the at least one image frame is not reconstructed based on the affine tools when the affine enabled flag is equal to zero. In some implementations, the affine enabled flag may be a syntax element sps_affine_enabled_flag when the first syntax structure is the SPS.

In some implementations, each of the first affine flags may indicate whether a corresponding one of the affine tools is enabled for the at least one image frame when the affine mode is enabled in the at least one image frame according to the affine enabled flag. In the implementation, one of the first affine flags corresponds to one of the affine tools.

In some implementations, some of the affine tools may be included in the tool group, and the others of the affine tool are not included in the tool group. In the implementation, the decoder module 124 may determine the first affine flags for the affine tools included in the tool group.

In some implementations, each of the first affine flags may indicate whether a corresponding one of the affine tools in the tool group is enabled for the at least one image frame. In some implementations, the affine tools in the tool group may include one or more of an affine PROF mode, an AMVR mode, and other affine tools. In addition, each of the first affine flags may be an affine tool enabled flag indicating whether a corresponding one of the affine tools in the tool group is enabled when the at least one image frame is reconstructed. In one implementation, each of the affine tool enabled flags may be a syntax element sps_affine_enabled_flag, when the first syntax structure is the SPS. For example, the affine tool enabled flags may include more than one of a syntax element sps_affine_prof_enabled_flag, a syntax element sps_affine_amvr_enabled_flag.

At block 603, the decoder module 124 determines whether at least one of the first affine flags is equal to a first predefined value. The method 600 may proceed to block 604 when the decoder module 124 determines that one or more of the first affine flags are equal to the first predefined value. The method may proceed to block 611 when the decoder module 124 determines that each of the first affine flags is different from the first predefined value.

In some implementations, with reference to FIG. 2, the decoder module 124 determines that at least one of the affine tools in the tool group is enabled for the at least one image frame when at least one of the first affine flags is equal to the first predefined value. In addition, the decoder module 124 determines that all the affine tools of the tool group are disabled during reconstruction of the at least one image frame when each of the first affine flags is different from the first predefined value. In other words, the at least one image frame is not reconstructed based on the affine tools in the tool group when the first affine flags are different from the first predefined value.

In some implementations, the first predefined value may be equal to one. Thus, the decoder module 124 determines that one of the affine tools in the tool group is enabled for the at least one image frame when one of the first affine flags is equal to one. In addition, the decoder module 124 determines that the affine tools in the tool group are disabled during reconstruction of the at least one image frame when all of the first affine flags are equal to zero.

At block 604, the decoder module 124 determines that a second affine flag is present in the first syntax structure.

In some implementations, with reference to FIG. 2, the decoder module 124 may determine that the first syntax structure includes the second affine flag when at least one of the first affine flags is equal to the first predefined value. Then, the decoder module 124 may determine the second affine flag from the first syntax structure. In one implementation, the first predefined value is equal to one. Thus, the decoder module 124 may determine the second affine flag from the first syntax structure when at least one of the first affine flags is equal to one.

In some implementations, the second affine flag may indicate whether the encoded data further includes a plurality of secondary flags each indicating whether all of the affine tools in the tool group are disabled during reconstruction of a corresponding one of the regions in the at least one image frame when at least one of the affine tools in the tool group is enabled in the at least one image frame according to the first affine flags.

In some implementations, the second affine flag may be an affine present flag indicating whether the encoded data further includes the secondary flag indicating whether all the affine tools of the tool group are disabled during reconstruction of one of the regions included in the at least one image frame. In the implementation, the secondary flag corresponds to the one of the regions in the at least one image frame.

In some implementations, the second affine flag only associates with the affine tools of the tool group. In the implementation, the second affine flag is unrelated to the affine tools which are not included in the tool group.

At block 605, the decoder module 124 determines whether the second affine flag is equal to a second predefined value. The method 600 may proceed to block 606 when the decoder module 124 determines that the second affine flag is equal to the second predefined value. The method may proceed to block 607 when the decoder module 124 determines that the second affine flag is different from the second predefined value.

In some implementations, with reference to FIG. 2, the decoder module 124 determines that the encoded data further includes the secondary flags each indicating whether all the affine tools in the tool group are disabled during reconstruction of the corresponding region when the second affine flag is equal to the second predefined value. In addition, the decoder module 124 determines that the encoded data does not include the secondary flags when the second affine flag is different from the second predefined value. In other words, the secondary flags are not parsed from the encoded data when the second affine flag is different from the second predefined value.

In some implementations, the second predefined value may be equal to one. Thus, the decoder module 124 determines that the encoded data further includes the secondary flags each corresponding to one of the one or more regions in the at least one image frame when the second affine flag is equal to one. In addition, the decoder module 124 determines that the secondary flags are not included in the encoded data when the second affine flag is equal to zero.

At block 606, the decoder module 124 determines that a third affine flag is present in a second syntax structure associated with a specific one of the one or more regions in a specific one of the at least one image frame.

In some implementations, each of the secondary flags is the third affine flag included in a corresponding one of a plurality of second syntax structures. In some implementations, the encoded data may include the first syntax structure and the second syntax structures. In addition, the number of the first syntax structure in the encoded data may be equal to one, and the number of the second syntax structures in the encoded data may be equal to the number of the regions included in the at least one image frame.

In some implementations, a first syntax level of the first syntax structure is higher than a second syntax level of the second syntax structures. In the implementation, each of the second syntax structures may have a reference to the first syntax structure, but the first syntax structure has no reference to the second syntax structures. For example, each of the second syntax structures may be a picture header. In another example, each of the second syntax structures may be a slice header.

In some implementations, with reference to FIG. 2, the decoder module 124 determines that each of the second syntax structures includes one of the third affine flags when the second affine flag is equal to the second predefined value. Then, the decoder module 124 may determine the third affine flags from the second syntax structures when the second affine flag is equal to the second predefined value. In the implementation, each of the third affine flags may indicate whether all the affine tools in the tool group are disabled when a corresponding one of the regions is reconstructed. In one implementation, the second predefined value is equal to one. Thus, the decoder module 124 may determine one of the third affine flags from a corresponding one of second syntax structures corresponding to a specific one of the one or more regions in a specific one of the at least one image frame when the second affine flag is equal to one.

In some implementations, each of the third affine flags included in a corresponding one of the second syntax structures also corresponds to one of the regions in the at least one image frame, since each of the second syntax structures corresponds to one of the regions in the at least one image frame.

In some implementations, each of the third affine flags corresponds to all the affine tools in the tool group, since each of the third affine flags indicates whether all the affine tools in the tool group are disabled in a corresponding one of the regions in the at least one image frame. In the implementation, each of the third affine flags is unrelated to the affine tools which are not included in the tool group.

In some implementations, each of the third affine flags may be an affine disabled flag indicating whether all the affine tools in the tool group are disabled when a corresponding one of the regions included in a corresponding one of the at least one image frame is reconstructed.

At block 607, the decoder module 124 infers that the third affine flag is equal to zero.

In some implementations, with reference to FIG. 2, the decoder module 124 determines that the third affine flags are not present in the second syntax structures when the second affine flag is different from the second predefined value. Then, the decoder module 124 infers that the third affine flags for the regions in the at least one image frame are equal to zero when the third affine flags are not present in the second syntax structures and the second affine flag is present in the first syntax structure.

In some implementations, the second predefined value may be equal to one. Thus, the decoder module 124 determines that the third affine flags are not parsed from the second syntax structures when the second affine flag is equal to zero. In addition, the third affine flags are inferred to be equal to zero when the second affine flag is equal to zero and the second affine flag is present in the first syntax structure.

At block 608, the decoder module 124 determines whether the third affine flag is equal to a third predefined value. The method 600 may proceed to block 609 when the decoder module 124 determines that the third affine flag is equal to the third predefined value. The method may proceed to block 610 when the decoder module 124 determines that the third affine flag is different from the third predefined value.

In some implementations, with reference to FIG. 2, the decoder module 124 determines that at least one of the affine tools in the tool group is enabled in a specific one of the regions when the third affine flag corresponding to the specific region is equal to the third predefined value. In addition, the decoder module 124 determines that all the affine tools in the tool group are disabled in the specific region when the third affine flag corresponding to the specific region is different from the third predefined value. In other words, the specific region may not be reconstructed based on the affine tools of the tool group when the third affine flag is different from the third predefined value.

In some implementations, the third predefined value may be equal to zero. Thus, the decoder module 124 determines that at least one of the affine tools in the tool group is enabled for the specific region when the third affine flag is equal to zero. In addition, the decoder module 124 determines that all the affine tools of the tool group are disabled in the specific region when the third affine flag is equal to one.

At block 609, the decoder module 124 reconstructs the specific region based on a plurality of first candidate modes selected based on the first affine flags.

In some implementations, with reference to FIG. 2, the decoder module 124 may determine that at least one of the affine tools in the tool group is enabled in the specific region when the third affine flag corresponding to the specific region is equal to the third predefined value. Thus, the specific region may be reconstructed based on the first candidate mode including the at least one of the affine tools in the tool group when the third affine flag is equal to the third predefined value. In some implementations, the at least one of the affine tools in the tool group may be selected from the affine tools based on the first affine flags. For example, a specific one of the affine tools indicated by a specific one of the first affine flags may be added into the first candidate modes when the specific first affine flag is equal to the first predefined value. In addition, the specific affine tool may be excluded from the first candidate modes when the specific first affine flag is different from the first predefined value.

In some implementations, the affine tools which are not included in the tool group are unrelated to the second affine flag and the third affine flags. Thus, the first candidate modes may include the affine tools, which are not included in the tool group, and other prediction modes.

In some implementations, the third predefined value is equal to zero. In the implementation, the decoder module 124 may determine that the at least one of the affine tools in the tool group is enabled in the specific region when the affine disabled flag is equal to zero. Then, the decoder module 124 may determine, from a third syntax structure, a plurality of block flags for a block unit included in the specific region. In the implementation, a specific one of the block flags indicates whether a prediction block of the block unit is reconstructed by a specific one of the affine tools.

In some implementations, the third syntax structure is a block-based syntax corresponding to the block unit. Thus, the third syntax structure is different from the first syntax structure and the second syntax structure, and a third syntax level of the third syntax structure is lower than the first syntax level and the second syntax level.

At block 610, the decoder module 124 reconstructs the specific region based on a plurality of second candidate modes excluding the affine tools in the tool group.

In some implementations, with reference to FIG. 2, the decoder module 124 may determine that all the affine tools in the tool group are disabled in the specific region when the third affine flag corresponding to the specific region is different from the third predefined value. Thus, the specific region may be reconstructed based on the second candidate modes excluding the affine tools in the tool group when the third affine flag is different from the third predefined value. In one implementation, the third predefined value is equal to zero. In the implementation, the decoder module 124 may determine that all the affine tools in the tool group are disabled in the specific region when the third affine flag is equal to one. In addition, the specific region may be reconstructed based on the second candidate modes. In the implementation, the affine tools in the tool group are excluded from the first candidate modes to generate the second candidate modes.

In some implementations, the affine tools which are not included in the tool group are unrelated to the second affine flag and the third affine flags. Thus, the affine tools which are not included in the tool group may still be included in the second candidate modes when the third affine flag is different from the third predefined value.

In some implementations, the third affine flag is the affine disabled flag. In the implementation, the decoder module 124 may determine that all the affine tools in the tool group are disabled in the specific region when the affine disabled flag is equal to one. Thus, the decoder module 124 may determine that a plurality of prediction blocks for a plurality of block units in the specific region are not reconstructed by the affine tools in the tool group when the specific region is reconstructed. In the implementation, the specific region is reconstructed based on the second candidate modes excluding the affine tools in the tool group. In the implementation, the affine tools in the tool group are excluded from the first candidate modes to generate the second candidate modes.

At block 611, the decoder module 124 reconstructs the at least one image frame based on the second candidate modes.

In some implementations, with reference to FIG. 2, the decoder module 124 may determine that all the affine tools in the tool group are disabled in the at least one image frame when each of the first affine flags is different from the first predefined value. Thus, the at least one image frame may be reconstructed based on the second candidate modes excluding the affine tools in the tool group when the first affine flags are different from the first predefined value. In one implementation, the first predefined value is equal to one. In the implementation, the decoder module 124 may determine that the affine tools in the tool group are disabled in the at least one image frame when the first affine flags are equal to zero. In addition, the at least one image frame may be reconstructed based on the second candidate modes when the first affine flags are equal to zero.

In some implementations, with reference to FIG. 2, the decoder module 124 determines that the second affine flag is not present in the first syntax structure when all the first affine flags are different from the first predefined value. Then, the decoder module 124 infers that the second affine flag for the at least one image frame is equal to zero when the second affine flags are not present in the first syntax structures. In the implementation, the third affine flags are not present in the second syntax structure, since the second affine flag is inferred to be equal to zero. Thus, the third affine flags are not parsed from the second syntax structures. In the implementation, the decoder module 124 may infer that the third affine flags are equal to one for disabling all the affine tools in the tool group since the first affine flags are different from the first predefined value for indicating that all the affine tools in the tool group are disabled in the at least one image frame.

Figure 7:
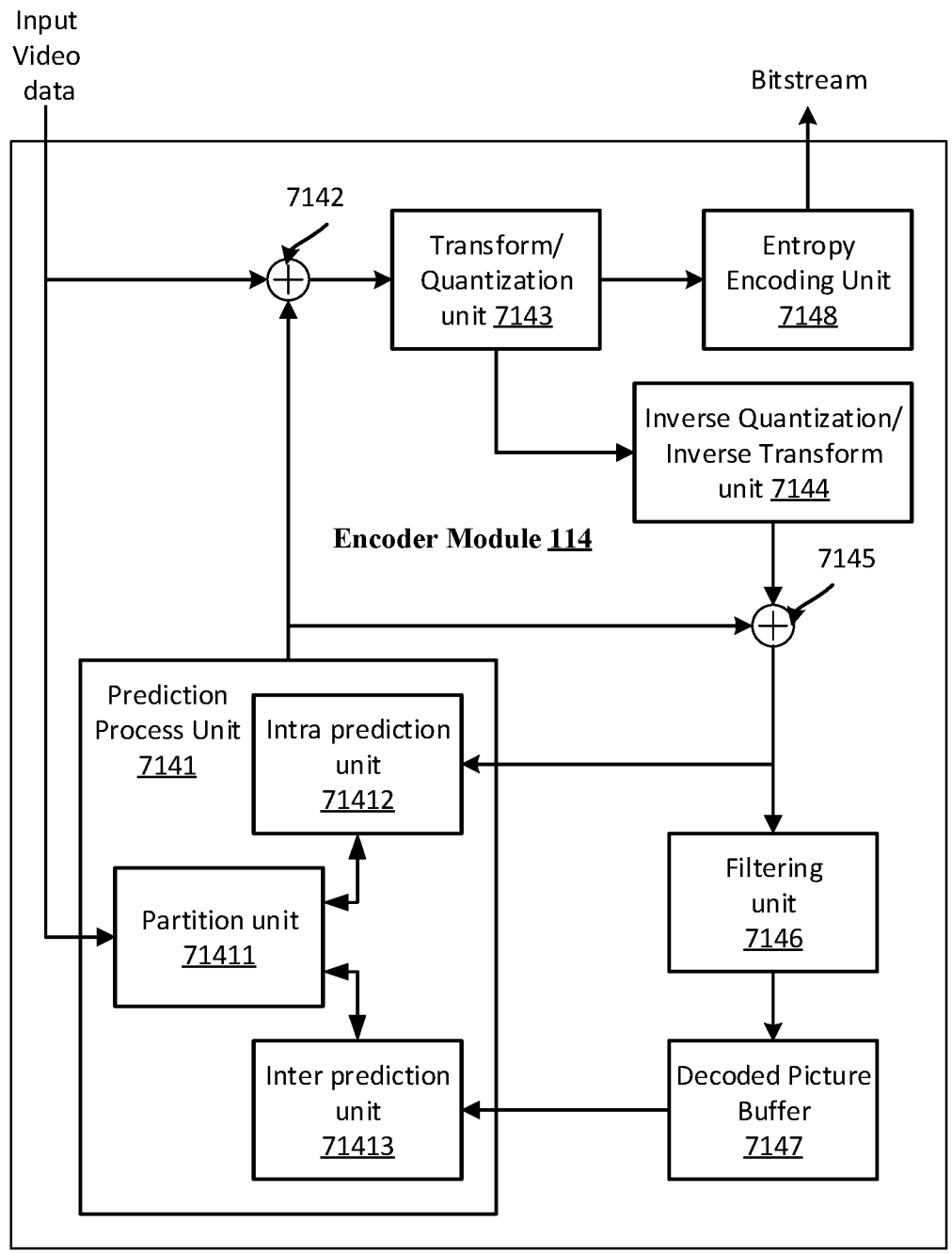
FIG. 7 illustrates a block diagram of an example of the encoder module of the first electronic device illustrated in FIG. 1.

FIG. 7 illustrates a block diagram of an example of the encoder module 114 of the first electronic device 110 illustrated in FIG. 1. The encoder module 114 may include a prediction processor (e.g., a prediction process unit 7141), at least a first summer (e.g., a first summer 7142) and a second summer (e.g., a second summer 7145), a transform/quantization processor (e.g., a transform/quantization unit 7143), an inverse quantization/inverse transform processor (e.g., an inverse quantization/inverse transform unit 7144), a filter (e.g., a filtering unit 7146), a decoded picture buffer (e.g., a decoded picture buffer 7147), and an entropy encoder (e.g., an entropy encoding unit 7148). The prediction process unit 7141 may further include a partition processor (e.g., a partition unit 71411), an intra prediction processor (e.g., an intra prediction unit 71412), and an inter prediction processor (e.g., an inter prediction unit 71413). The encoder module 114 may receive the source video and encode the source video to output a bitstream.

The encoder module 114 may receive a source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, CTUs, CBs, sub-divisions thereof, and/or another equivalent coding unit.

In some implementations, the encoder module 114 may perform additional sub-divisions of the source video. It should be noted that these implementations are generally applicable to video coding regardless of how the source video is partitioned prior to and/or during the encoding.

In some implementations, during the encoding process, the prediction process unit 7141 may receive a current image block of a specific one of the image frames during the encoding process. The current image block may be the luminance block or one of the chrominance blocks in the specific image frame.

The partition unit 71411 may divide the current image block into multiple block units. The intra prediction unit 71412 may perform intra-predictive coding of a current block unit relative to one or more neighboring blocks in the same frame as the current block unit in order to provide spatial prediction. The inter prediction unit 71413 may perform inter-predictive coding of the current block unit relative to one or more blocks in one or more reference image blocks to provide temporal prediction.

In some implementations, the prediction process unit 7141 may select one of the coding results generated by the intra prediction unit 71412 and the inter prediction unit 71413 based on a mode selection method, such as a cost function. The mode selection method may be a rate-distortion optimization (RDO) process.

The prediction process unit 7141 may determine the selected coding result and provide a predicted block corresponding to the selected coding result to the first summer 7142 for generating a residual block and to the second summer 7145 for reconstructing the encoded block unit. The prediction process unit 7141 may further provide syntax elements such as motion vectors, intra mode indicators, partition information, and other syntax information to the entropy encoding unit 7148.

In some implementations, the intra prediction unit 71412 may intra predict the current block unit. The intra prediction unit 71412 may determine an intra prediction mode directed toward a reconstructed sample neighboring the current block unit in order to encode the current block unit.

In some implementations, the intra prediction unit 71412 may encode the current block unit using various intra prediction modes and the intra prediction unit 71412 or the prediction process unit 7141 may select an appropriate intra prediction mode from the various intra prediction modes. The intra prediction unit 71412 may encode the current block unit using a cross component prediction mode to predict one of the two chroma components of the current block unit based on the luma components of the current block unit. The intra prediction unit 71412 may predict a first one of the two chroma components of the current block unit based on the second of the two chroma components of the current block unit.

In some implementations, the inter prediction unit 71413 may inter predict the current block unit as an alternative to the intra prediction performed by the intra prediction unit 71412. The inter prediction unit 71413 may perform motion estimation to estimate motion of the current block unit for generating a motion vector.

The motion vector may indicate a displacement of the current block unit within the current image block relative to a reference block unit within a reference image block. The inter prediction unit 71413 may receive at least one reference image block stored in the decoded picture buffer 7147 and estimate the displacement based on the received reference image blocks to generate the motion vector.

In some implementations, the first summer 7142 may generate the residual block by subtracting the prediction block determined by the prediction process unit 7141 from the original current block unit. The first summer 7142 may represent the component or components that perform this subtraction operation.

In some implementations, the transform/quantization unit 7143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform, or a conceptually similar transform.

In some implementations, the transform may convert the residual information from a pixel value domain to a transform domain, such as a frequency domain. The degree of quantization may be modified by adjusting a quantization parameter.

In some implementations, the transform/quantization unit 7143 may perform a scan of the matrix including the quantized transform coefficients. Alternatively, the entropy encoding unit 7148 may perform the scan.

In some implementations, the entropy encoding unit 7148 may receive a plurality of syntax elements from the prediction process unit 7141 and the transform/quantization unit 7143 including a quantization parameter, transform data, motion vectors, intra modes, partition information, and other syntax information. The entropy encoding unit 7148 may encode the syntax elements into the bitstream.

In some implementations, the entropy encoding unit 7148 may entropy encode the quantized transform coefficients by performing CAVLC, CABAC, SBAC, PIPE coding, or another entropy coding technique to generate an encoded bitstream. The encoded bitstream may be transmitted to another device (second electronic device 120 illustrated in FIG. 1) or archived for later transmission or retrieval.

In some implementations, the inverse quantization/inverse transform unit 7144 may apply inverse quantization and inverse transformation to reconstruct the residual block in the pixel domain for later use as a reference block. The second summer 7145 may add the reconstructed residual block to the prediction block provided from the prediction process unit 7141 in order to produce a reconstructed block for storage in the decoded picture buffer 7147.

In some implementations, the filtering unit 7146 may include a deblocking filter, an SAO filter, a bilateral filter, and/or an ALF to remove blocking artifacts from the reconstructed block. Additional filters (in-loop or post-loop) may be used in addition to the deblocking filter, the SAO filter, the bilateral filter, and the ALF. Such filters are not illustrated for brevity and may filter the output of the second summer 7145.

In some implementations, the decoded picture buffer 7147 may be a reference picture memory that stores the reference block for use by the encoder module 114 to encode video, such as in intra or inter-coding modes. The decoded picture buffer 7147 may include a variety of memory devices such as DRAM (including SDRAM), MRAM, RRAM, or other types of memory devices. The decoded picture buffer 7147 may be on-chip with other components of the encoder module 114 or off-chip relative to those components.

In some implementations, the encoder module 114 may receive video data and use a plurality of prediction modes to predict a plurality of image frames in the video data. In the implementation, the prediction modes may include a plurality of refinement tools and an affine mode having a plurality of affine tools. In some implementations, with respect to FIG. 2, the encoder module 114 may signal at least one of a first affine flag, a second affine flag, and a plurality of third affine flags according to the prediction result to generate encoded data corresponding to at least one image frame of the video data, and then add the encoded data into the bitstream for providing to the decoder module 124. In another implementation, the encoder module 114 may signal at least one of a plurality of first refinement flags, a second refinement flag, and a plurality of third refinement flags according to the prediction result to generate encoded data corresponding to at least one image frame of the video data, and then add the encoded data into the bitstream for providing to the decoder module 124.

The described implementations are to be considered in all respects as illustrative and not restrictive. It should also be understood that the present disclosure is not limited to the particular implementations described above, but that many rearrangements, modifications, and substitutions are possible without departing from the scope of the present disclosure.

What is claimed is:

1. A method of decoding a bitstream by an electronic device, the method comprising:
    receiving encoded data, as part of the bitstream, for at least one image frame, wherein each of the at least one image frame includes one or more regions;
    determining a first affine flag from a sequence parameter set (SPS) associated with the at least one image frame when an affine mode is enabled in the at least one image frame, wherein the SPS is included in the encoded data and the affine mode includes a plurality of affine tools;
    determining that a second affine flag is present in the SPS when the first affine flag is equal to one;
    determining that a third affine flag is present in a slice header associated with a specific one of the one or more regions in a specific one of the at least one image frame when the second affine flag is equal to one, wherein:
        the slice header is included in the encoded data,
        the third affine flag corresponds to one of the plurality of affine tools,
        the one of the plurality of affine tools is an affine prediction refinement with optical flow (PROF) mode, and
        the third affine flag is an affine PROF disabled flag indicating whether the affine PROF mode is disabled when the specific one of the one or more regions associated with the slice header is reconstructed; and
    reconstructing the specific one of the one or more regions based on a plurality of first candidate modes including the one of the plurality of affine tools when the third affine flag is equal to zero.

2. The method according to claim 1, further comprising:
    determining that the third affine flag is not present in the slice header when the second affine flag is equal to zero.

3. The method according to claim 2, further comprising:
    determining that the second affine flag is not present in the SPS when the first affine flag is equal to zero; and
    inferring that the second affine flag is equal to zero when the second affine flag is not present in the SPS.

4. The method according to claim 1, further comprising:
    inferring that the third affine flag is equal to zero when the second affine flag is present in the SPS and the third affine flag is not present in the slice header.

5. The method according to claim 1, further comprising:
    disabling the affine PROF mode for the specific one of the one or more regions when the third affine flag is equal to one; and
    reconstructing the specific one of the one or more regions based on a plurality of second candidate modes, wherein the affine PROF mode is excluded from the plurality of first candidate modes to generate the plurality of second candidate modes.

6. The method according to claim 1, wherein:
    a syntax level of the SPS is higher than a syntax level of the slice header,
    the at least one image frame is included in a video sequence of the bitstream and the SPS corresponds to the video sequence, and
    the specific one of the one or more regions is a slice included in the specific one of the at least one image frame in the video sequence and the slice header corresponds to the slice.

7. The method according to claim 1, wherein:
    the first affine flag is an affine PROF enabled flag indicating whether the affine PROF mode is enabled when the at least one image frame associated with the SPS is reconstructed, and
    the second affine flag is an affine PROF present flag indicating whether the affine PROF disabled flag is included in the slice header.

8. The method according to claim 7, further comprising:
    disabling the affine PROF mode for the at least one image frame associated with the SPS when the affine PROF enabled flag is equal to zero; and
    reconstructing the at least one image frame based on a plurality of second candidate modes, wherein the affine PROF mode is excluded from the plurality of first candidate modes to generate the plurality of second candidate modes.

9. The method according to claim 7, further comprising:
    enabling the affine PROF mode for the specific one of the one or more regions associated with the slice header when the affine PROF disabled flag is equal to zero;
    determining, based on a block flag, whether a block unit in the specific one of the one or more regions is predicted by the affine mode, wherein the block flag is included in a syntax structure different from the SPS and the slice header, and the syntax structure corresponds to the block unit;
    predicting the block unit based on the affine mode to generate a prediction block when the block flag is equal to one; and
    refining the prediction block according to the affine PROF mode.

10. An electronic device for decoding a bitstream, the electronic device comprising:
  at least one processor; and
  a storage device coupled to the at least one processor and storing one or more machine-executable instructions which, when executed by the at least one processor, cause the electronic device to:
    receive encoded data, as part of the bitstream, for at least one image frame, wherein each of the at least one image frame includes one or more regions;
    determine a first affine flag from a sequence parameter set (SPS) associated with the at least one image frame when an affine mode is enabled in the at least one image frame, wherein the SPS is included in the encoded data and the affine mode includes a plurality of affine tools;
    determine that a second affine flag is present in the SPS when the first affine flag is equal to one;
    determine that a third affine flag is present in a slice header associated with a specific one of the one or more regions in a specific one of the at least one image frame when the second affine flag is equal to one, wherein:
      the slice header is included in the encoded data,
      the third affine flag corresponds to one of the plurality of affine tools,
      the one of the plurality of affine tools is an affine prediction refinement with optical flow (PROF) mode, and
      the third affine flag is an affine PROF disabled flag indicating whether the affine PROF mode is disabled when the specific one of the one or more regions associated with the slice header is reconstructed; and
    reconstruct the specific one of the one or more regions based on a plurality of first candidate modes including the one of the plurality of affine tools when the third affine flag is equal to zero.

11. The electronic device according to claim 10, wherein the one or more machine-executable instructions, when executed by the at least one processor, further cause the electronic device to:
  determine that the second affine flag is not present in the SPS when the first affine flag is equal to zero;
  infer that the second affine flag is equal to zero when the second affine flag is not present in the SPS; and
  determine that the third affine flag is not present in the slice header when the second affine flag is equal to zero.

12. The electronic device according to claim 10, wherein the one or more machine-executable instructions, when executed by the at least one processor, further cause the electronic device to:
  determine that the third affine flag is not present in the slice header when the second affine flag is equal to zero; and
  infer that the third affine flag is equal to zero when the second affine flag is present in the SPS and the third affine flag is not present in the slice header.

13. The electronic device according to claim 10, wherein the one or more machine-executable instructions, when executed by the at least one processor, further cause the electronic device to:
  disable the affine PROF mode for the specific one of the one or more regions when the third affine flag is equal to one; and
  reconstruct the specific one of the one or more regions based on a plurality of second candidate modes, wherein the affine PROF mode is excluded from the plurality of first candidate modes to generate the plurality of second candidate modes.

14. The electronic device according to claim 10, wherein:
  the first affine flag is an affine PROF enabled flag indicating whether the affine PROF mode is enabled when the at least one image frame associated with the SPS is reconstructed, and
  the second affine flag is an affine PROF present flag indicating whether the affine PROF disabled flag is included in the slice header.

15. The electronic device according to claim 14, wherein the one or more machine-executable instructions, when executed by the at least one processor, further cause the electronic device to:
  disable the affine PROF mode for the at least one image frame associated with the SPS when the affine PROF enable flag is equal to zero; and
  reconstruct the at least one image frame based on a plurality of second candidate modes, wherein the affine PROF mode is excluded from the plurality of first candidate modes to generate the plurality of second candidate modes.

16. A method of decoding a bitstream by an electronic device, the method comprising:
  receiving encoded data, as part of the bitstream, for at least one image frame, wherein each of the at least one image frame includes one or more regions;
  determining a first affine flag from a sequence parameter set (SPS) associated with the at least one image frame when an affine mode is enabled in the at least one image frame, wherein the SPS is included in the encoded data and the affine mode includes a plurality of affine tools;
  determining, based on the first affine flag, whether a second affine flag is present in the SPS;
  determining, based on the second affine flag, whether a third affine flag is present in a slice header associated with a specific one of the one or more regions in a specific one of the at least one image frame, wherein:
    the slice header is included in the encoded data,
    the third affine flag corresponds to one of the plurality of affine tools,
    the one of the plurality of affine tools is an affine prediction refinement with optical flow (PROF) mode, and
    the third affine flag is an affine PROF disabled flag indicating whether the affine PROF mode is disabled when the specific one of the one or more regions associated with the slice header is reconstructed; and
  reconstructing the specific one of the one or more regions based on a plurality of first candidate modes including the one of the plurality of affine tools when the third affine flag is equal to zero.

17. The method according to claim 16, further comprising:
  determining that the second affine flag is present in the SPS when the first affine flag is equal to one; and
  determining that the second affine flag is not present in the SPS and inferring that the second affine flag is equal to zero when the first affine flag is equal to zero.

18. The method according to claim 16, further comprising:
  determining that the third affine flag is present in the slice header when the second affine flag is equal to one; and
  determining that the third affine flag is not present in the slice header when the second affine flag is equal to zero.

19. The method according to claim 16, further comprising:
- disabling the affine PROF mode for the at least one image frame associated with the SPS when the first affine flag is equal to zero; and
- reconstructing the at least one image frame based on a plurality of second candidate modes, wherein the affine PROF mode is excluded from the plurality of first candidate modes to generate the plurality of second candidate modes,
- wherein the first affine flag is an affine PROF enabled flag indicating whether the affine PROF mode is enabled when the at least one image frame associated with the SPS is reconstructed.

* * * * *